United States Patent [19]

Hiraoka et al.

[11] Patent Number: 5,760,987
[45] Date of Patent: Jun. 2, 1998

[54] MAGNETIC REPRODUCING APPARATUS FOR REPRODUCING INFORMATION RECORDED IN BOTH A DIGITAL AND ANALOG FORMAT

[75] Inventors: Shinichi Hiraoka; Kouichi Hara, both of Hiroshima-ken, Japan

[73] Assignee: Sharp Kabushiki Kaisha, Osaka, Japan

[21] Appl. No.: 579,914

[22] Filed: Dec. 28, 1995

Related U.S. Application Data

[63] Continuation of Ser. No. 205,852, Mar. 4, 1994, abandoned.

[30] Foreign Application Priority Data

Mar. 12, 1993 [JP] Japan ................... 5-051732

[51] Int. Cl.$^6$ ........................... G11B 15/17
[52] U.S. Cl. ........................... 360/69; 360/63
[58] Field of Search ............... 360/27, 65, 69, 360/63, 75, 77.12; 369/15

[56] References Cited

U.S. PATENT DOCUMENTS

| | | | |
|---|---|---|---|
| 4,646,173 | 2/1987 | Kammeyer et al. | 360/51 |
| 5,260,836 | 11/1993 | Yada et al. | 360/63 X |
| 5,296,977 | 3/1994 | Fujioka | 360/63 |
| 5,313,342 | 5/1994 | Soda et al. | 360/63 |
| 5,490,018 | 2/1996 | Yamashita | 360/65 X |

FOREIGN PATENT DOCUMENTS

| | | | |
|---|---|---|---|
| 0323870 | 7/1989 | European Pat. Off. | |
| 0381266 | 8/1990 | European Pat. Off. | |
| 0430265 | 6/1991 | European Pat. Off. | 360/63 |
| 0430268 | 6/1991 | European Pat. Off. | |
| 0430613 | 6/1991 | European Pat. Off. | 360/32 |
| 0456316 | 11/1991 | European Pat. Off. | |
| 0459579 | 12/1991 | European Pat. Off. | |
| 0529733 | 3/1993 | European Pat. Off. | |
| 0535737 | 4/1993 | European Pat. Off. | |
| 4-206001 | 7/1992 | Japan . | |
| 5-73808 | 3/1993 | Japan . | |
| WO-A-8401656 | 4/1984 | WIPO . | |

OTHER PUBLICATIONS

Advanced Audio Technologies Stimulate Concepts for Future Use (author unknown) pp. 32–37, Jul. 1993.
IEEE Transactions on Consumer Electronics, 39 (1993) Aug., No. 3, New York, "New Developments For The Digital Compact Cassette System", Gerard C.P. Lokhoff et al, Eindhoven, The Netherlands.
SU-A-1 675 938—Soviet Patent Abstract, Week Issued 9229/Sep. 2, 1992.
Abstract of Japanese Patent Laid-Open No. 5-73808—Magnetic Tape Device No Date.

*Primary Examiner*—Aristotelis M. Psitos
*Assistant Examiner*—Larry T. Cullen

[57] ABSTRACT

A switch is provided which successively switches contacts at a timing sufficiently quick with respect to reproduced signals in reproducing a magnetic tape on which digital recording is effected, and which switches contacts at similar timing in reproducing a magnetic tape on which analog recording is effected. On signals provided through this switch and through an analog-digital converting circuit, processing such as waveform equalization corresponding to the type of magnetic tape is effected by a digital equalizer. By this digital equalizer, correction of frequency characteristic in accordance with the type of the magnetic tape and correction of frequency characteristic inherent to the head per se are effected.

20 Claims, 17 Drawing Sheets

FIG. 5(a) - DIGITAL RECORDING
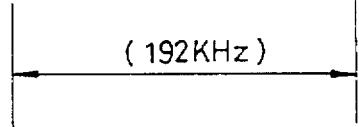
FIG. 5(b) - ANALOG RECORDING
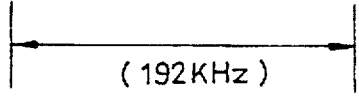

MAGNETIC REPRODUCING APPARATUS FOR REPRODUCING INFORMATION RECORDED IN BOTH A DIGITAL AND ANALOG FORMAT

This application is a continuation of application Ser. No. 08/205,852 filed on Mar. 4, 1994, now abandoned.

BACKGROUND OF THE INVENTION

1. Field of the Invention

The present invention relates to a magnetic reproducing apparatus, for example a magnetic tape reproducing apparatus, which is adapted to reproduce information recorded on a magnetic medium in at least two different recording formats.

2. Description of the Related Art

Recently, digital recording technique has been developed in the field of magnetic tape apparatuses. Equipments capable of recording-reproducing information in the form of digital signals such as a digital audio tape recorder has been developed. However, these equipments are not compatible with conventional equipments for recording-reproducing analog signals, and therefore such digital equipments have not yet been widely accepted.

This being the case, equipments which are compatible with the conventional analog recording-reproducing equipments have been proposed. For example, a cassette recorder-reproducer for recording and reproducing analog signals using a cassette tape containing a magnetic tape therein has been known. There has been proposed a cassette, recorder-reproducer, which is an improvement of the conventional one, which allows recording-reproducing of digital signals by a cassette tape of a similar type as the cassette tape mentioned above.

For audio recording digital signals on the aforementioned cassette recorder-reproducer, eighteen tracks TR1-1 to TR1-18 are formed on a first type of magnetic tape (T1), for example, as shown in FIG. 12. In such a recording format, tracks TR1-1 to TR1-9 and tracks TR1-10 to TR1-18 correspond to two divided recording areas α1 and β1 of the tape, and synthesized stereo sound are recorded on the tracks TR1-1 to TR1-9 and tracks TR1-10 to TR1-18.

For reproduction, magnetic tape T1 is moved in the direction of the arrow P so as to read audio signals on tracks TR1-1 to TR1-9, while the tape T1 is moved in the direction of the arrow Q so as to read audio signals on tracks TR1-10 to TR1-18.

When audio recording is to be carried out in the conventional analog manner by using the cassette recorder-reproducer, four tracks TR2-1 to TR2-4 are formed on a magnetic tape T2, for example, as shown in FIG. 13. In such a recording format, tracks TR2-1 and TR2-2 and tracks TR2-3 and TR2-4 correspond to two divided recording areas α2 and β2. Audio signals of left and right channels are recorded on tracks TR2-1 and TR2-2, respectively, while audio signals of right and left channels are recorded on tracks TR2-3 and TR2-4, respectively.

In order to read audio signals on tracks TR2-1 and TR2-2, magnetic tape T2 is moved in the direction of the arrow P, while in order to read audio signals on tracks TR2-3 and TR2-4, magnetic tape T2 is moved in the direction of the arrow Q. Arrows in tracks TR1-1 to TR1-18 of FIG. 12 and arrows in tracks TR2-1 to TR2-4 of FIG. 13 show arrangements of magnetic flux.

Reproduction of the above described magnetic tapes T1 and T2 will be described.

First, a head 11 shown in FIG. 14 includes a head unit 12 having head elements DH11 to DH19 as well as head elements AH11 and AH12 arranged in the widthwise direction of magnetic tape T1 (T2) mounted on a head base 13. When magnetic tape T1 (T2) runs in the direction of P, head elements DH11 to DH19 of head 11 are placed so as to be in contact with the recording area α1 of magnetic tape T1 while head elements AH11 and AH12 are placed so as to be in contact with recording area a2 of magnetic tape T2.

Head 11 is adapted to be rotated by 180° by means of an overturning mechanism (not shown) and when turned over, head unit 12 is switched from the position shown in FIG. 14 to the position shown in FIG. 15. Thus head elements DH11 to DH19 come to be in contact with recording area β1 of magnetic tape T1, while head elements AH11 and AH12 come to be in contact with recording area β2 of magnetic tape T2, so that information on magnetic tape type T1 (T2) can be read with the tape running direction reversed to the direction Q.

Referring to FIG. 16, in reproduction of magnetic tape T1, outputs from head elements DH11 to DH19 are amplified to a prescribed amplitude by means of head amplifiers A11 to A19, and equalizing is effected for correcting frequency characteristic inherent to the heads per se. In a common practice of equalizing, the signal is subjected to analog-digital conversion, followed by digital equalizing which provides higher precision. At present, not a number of expensive analog-digital converting circuits ADR and digital equalizing circuits DEQR are incorporated for respective tracks, but only a set of an analog-digital converting circuit ADR and a digital equalizing circuit DEQR is incorporated and switched time divisionally by means of switches SMR and SDR which are switched in synchronization, as shown in FIG. 16, for effecting equalization for each track.

The equalized signal is subjected to demodulation and error correction in a demodulation-error correction circuit SP. In that case, if the signal to be reproduced has been compressed at the time of recording, the signal is also subjected to expansion by an expanding circuit DFR. Thereafter, the equalized-demodulated-error corrected (and expanded) signal is processed in an output circuit OPR to have a data format conforming a digital-analog converting circuit DAR of the succeeding stage, and then it is output. The output signal is turned to an audio signal by the digital-analog converting circuit DAR, and output through a switch SOUT and LINE OUT.

In reproduction from magnetic-tape T2, as in reproducing process effected in a conventional cassette recorder-reproducer, outputs from head elements AH11 and AH12 are amplified to a prescribed amplitude by head amplifiers ARR and ALR. A tape type indicating hole on an outer housing of the cassette tape is detected and a switch SEQ is switched accordingly, so that equalizing is effected by an equalizer Z1 or Z2 for correcting frequency characteristic particular to the tape type and for correcting frequency characteristic inherent to the head. Noise reduction is effected by a noise reduction circuit NRR as needed, and an output is provided through switch SOUT and LINE OUT.

When determination of the type of magnetic tapes T1 and T2, not shown, is carried out by detecting the tape type indicating hole on the case containing the tape, switch SOUT is automatically switched.

Some magnetic tape reproducing apparatus of this type employ a magneto-resistive head (MR head) as a reproducing head. Referring to FIG. 17, one end of each of MR head elements DH11 to DH19 are connected to one end of each of sense current sources I11 to I19 generating a sensing current respectively, and to an input end of each of head amplifiers A11 to A19 respectively, and the other end of respective head elements are grounded. A voltage+B is applied to the sense current sources I11 to I19 from a power supply terminal 9 which is connected to the other end of each of the sources.

In the magnetic tape reproducing apparatus structured in this manner, a sensing current is constantly supplied from sensing current sources I11 to I19 to all of the MR head elements DH11 to DH19 during reproduction. Accordingly, the electrical resistance of MR head elements DH11 to DH19 which are in contact with respective tracks on the magnetic tape is changed dependent on the change in the magnetic signal on the magnetic tape, and this change is output as a change in voltage, by using the sensing current. Output signals from MR heads DH11 to DH19 are taken out as read signals and provided to the head amplifiers A11 to A19.

However, the above described circuit is complicated since it includes head amplifiers A11 to A19, a switch SMR, an analog-digital converting circuit ADR, a digital equalizing circuit DEQR, a switch SDR, a demodulation-error correction circuit SP, an expansion circuit DFR, a digital-analog converting circuit DAR and a switch SOUT, for digital reproduction, as well as head amplifiers ARR and ALR, a switch SEQ, equalizing circuits Z1 and Z2, a noise reduction NRR and a switch SOUT, for analog reproduction. This leads to a large number of parts and portions to be adjusted, resulting in higher manufacturing costs and lower production yield.

SUMMARY OF THE INVENTION

An object of the present invention is to simplify circuit structure while maintaining a function of reproducing information recorded on a magnetic recording medium in different recording formats.

Another object of the present invention is to prevent unnecessary consumption of sensing current in a magnetic reproducing apparatus using an MR head.

A magnetic reproducing apparatus in accordance with an aspect of the present invention is for reproducing information from a first type of magnetic recording medium on which information is recorded in a first recording format and from a second type of magnetic recording medium on which information is recorded in a second recording format which is different from the first recording format, including a first reproducing unit for reproducing information recorded on the first type of magnetic recording medium, a second reproducing unit for reproducing information recorded on the second type of magnetic recording medium, a detecting circuit for detecting whether the magnetic recording medium loaded in the body of the apparatus is the first type of magnetic recording medium or the second type of magnetic recording medium, an equalizer for performing a prescribed waveform equalization based on the result of detection from the detecting circuit, and a selecting circuit for selecting and guiding to the equalizer a reproduction signal from the first reproducing unit or the second reproducing unit based on the result of detection by the detecting circuit.

Accordingly, when information is to be reproduced from the first and second types of recording media on which recording is effected in the first and second recording formats, signals can be processed by using one equalizer, and therefore an equalizing circuit for correcting frequency characteristic of the second magnetic recording medium on which recording is effected in the second recording format and for correcting frequency characteristic inherent to the head per se becomes unnecessary, whereby the reproducing circuit can be simplified.

The magnetic reproducing apparatus in accordance with another aspect of the present invention is for reproducing information from a first type of magnetic recording medium on which information is recorded in a first recording format and from a second type of magnetic recording medium on which information is recorded in a second recording format which is different from the first recording format, including a reproducing unit for reproducing information recorded on the first and second types of magnetic recording media, a detecting circuit for detecting whether the magnetic recording medium loaded in the body of the apparatus is the first type of magnetic recording medium or the second type of magnetic recording medium, and an equalizer for performing a prescribed waveform equalization on a reproduced signal from the reproducing unit based on the result of detection by the detecting circuit. Accordingly, information is reproduced by one reproducing unit from the first and second type of magnetic recording media on which recording is effected in the first and second recording formats, a reproducing unit for the second type of magnetic recording medium on which recording is effected in the second recording format becomes unnecessary, so that the structure of the apparatus, and hence the circuit structure, can be simplified.

Since signal processing can be effected by using one equalizer, an equalizing circuit for correcting frequency characteristic of the second type of magnetic recording medium on which recording is effected in the second recording format and for correcting frequency characteristic inherent to the head per se becomes unnecessary, so that the reproduction circuit can be simplified.

The magnetic reproducing apparatus in accordance with a still another aspect of the present invention is for reproducing information from a first type of magnetic recording medium on which information is recorded in a first recording format, and from a second type of recording medium on which information is recorded in a second format different from the first recording format, including a reproducing unit for reproducing information recorded on the first and second types of magnetic recording media, detecting circuit for detecting whether the magnetic recording medium loaded in the body of the apparatus is the first type of magnetic recording medium or the second type of magnetic recording medium, and a control circuit for controlling sensing current to be supplied to the reproducing unit in accordance with the result of detection of the detecting circuit.

Therefore, both the first and second magnetic types of recording media on which recording is effected in the first and second recording formats respectively can be reproduced by only one reproducing unit, so that the structure of the reproducing circuit and the magnetic head can be simplified. In addition, the sensing current can be controlled at the time of reproduction of the second magnetic recording medium in which recording is effected in the second recording format, whereby unnecessary consumption of sensing current can be prevented.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 5(a) and (b) are a timing chart showing switching operation of a signal switching circuit used in the magnetic tape reproducing apparatus shown in FIG. 1.

DESCRIPTION OF THE PREFERRED EMBODIMENTS

<Embodiment 1>

Figure 3:
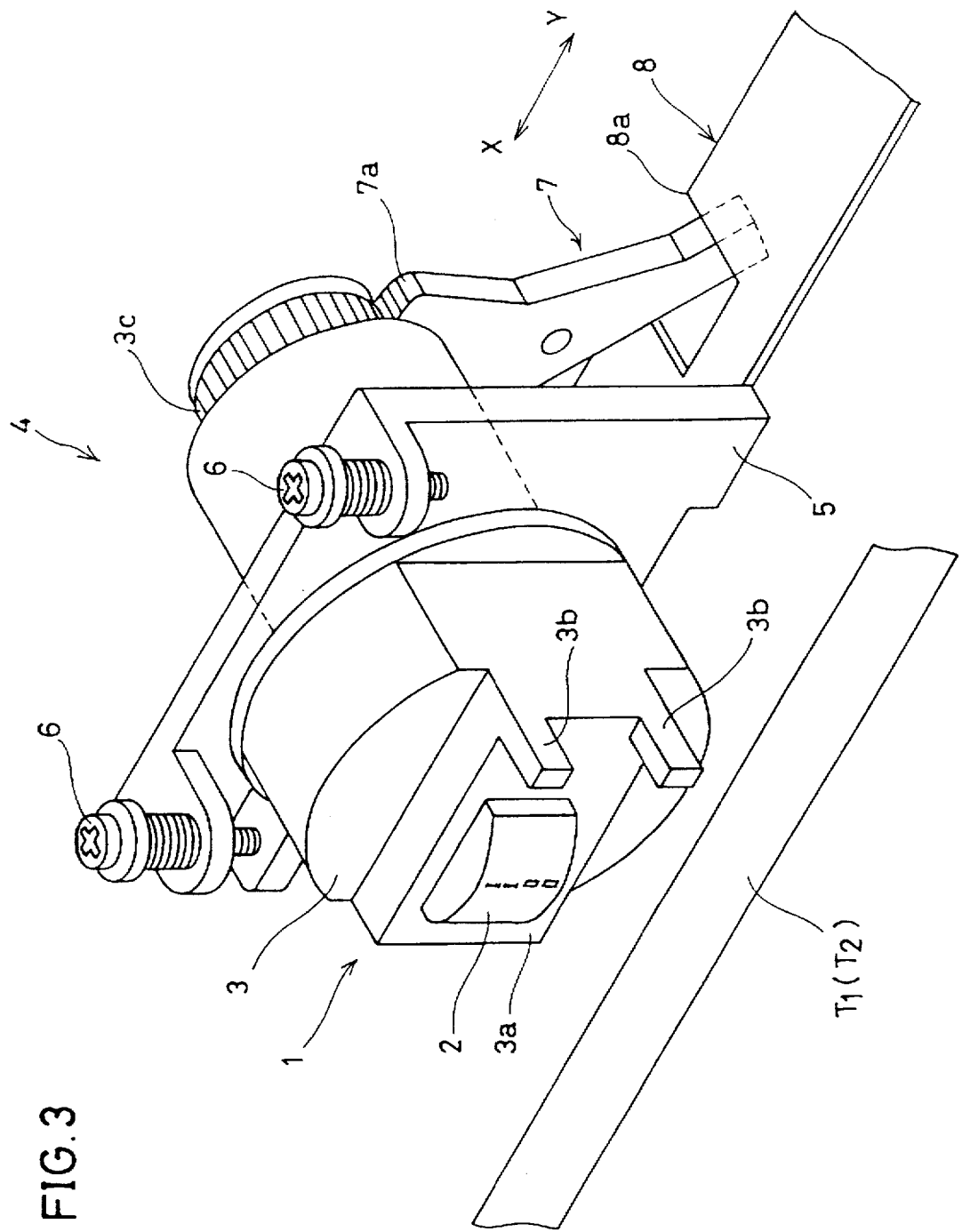
FIG. 3 is a perspective view showing a head overturning mechanism used in the magnetic tape reproducing apparatus shown in FIG. 1.

First, a head overturning mechanism included in a magnetic tape reproducing apparatus, which is a magnetic tape reproducing apparatus in accordance with the first embodiment of the present invention, will be described. Referring to FIG. 3, a magnetic head 1 includes a head unit 2 fixed on a head base 3, and it is turned by 180° by an overturning mechanism 4 as head overturning means.

A tape guide 3b for regulating movement of a magnetic tape T1 (T2) in the width direction is provided on one end of a fixed surface 3a on which base unit 2 is fixed. Head base 3 is rotatably held approximately at the center of a body, by means of a head base holding member 5 fixed against a chassis, not shown. On head base holding member 5, an azimuth adjusting screw 6 is provided. Deviation in azimuth angle of head elements DH1 to DH9, which will be described later, of the head unit 2 resulting from rotation of head 1 can be corrected by fastening azimuth adjusting screw 6.

At an opposite end of fixed surface 3a of head base 3, there is provided a gear 3c. Below gear 3c, a rotatable lever 7 is provided such that a gear 7a formed on upper end of lever 7 engages with gear 3c.

A slider 8 driven and slid in the direction of X-Y by means of a slide driving mechanism, not shown, is provided below lever 7. Slider 8 has a notch 8a, on which notch 8a the other end on the lower side of lever 7 abuts.

In overturning mechanism 4 structured as described above, when slider 8 slides in the X-Y direction, lever 7 turns, and in accordance with this movement, gear 3c rotates. Along with the rotation of gear 3c, head base 3 as a whole rotates, and head unit 2 is overturned by 180°. At the time of reproduction, overturning mechanism 4 is driven by a driving mechanism, not shown, from a standby position shown in the figure to a prescribed position at which it is brought into contact with magnetic tape T1 (T2). When head unit 2 is to be overturned, it is once returned to the standby position, and head base 3 is turned.

On head unit 2, head elements DH1 to DH9 which are thin film heads for the first recording format (first magnetic heads) are provided at equal intervals on one side of the center on the tape contact surface, while head elements AH1 and AH2 which are thin film heads for the second recording format (second magnetic heads) are formed on the other side. In order to amplify reproduced signals from magnetic tape T1 (T2) to a prescribed amplitude, head elements DH1 to DH9 are connected to head amplifiers A1 to A9, while head elements AH1 and AH2 are connected to head amplifiers AL and AR.

An output from each of the head amplifiers is connected to an input side of switch SM1 which is for time divisionally switching a set of analog-digital converting circuit AD and a digital equalizing circuit DEQ for highly precise digital equalizing. A signal output from digital equalizing circuit DEQ is input to switch SD1, and input to a demodulation-error correction circuit SP1 of the succeeding stage track by track by this switch SD1 which switches in synchronization with switch SM1.

An output from demodulation-error corrections circuit SP1 is input to a digital-analog converting circuit DA for providing analog audio signals, and then output to LINE OUT.

Figure 1:
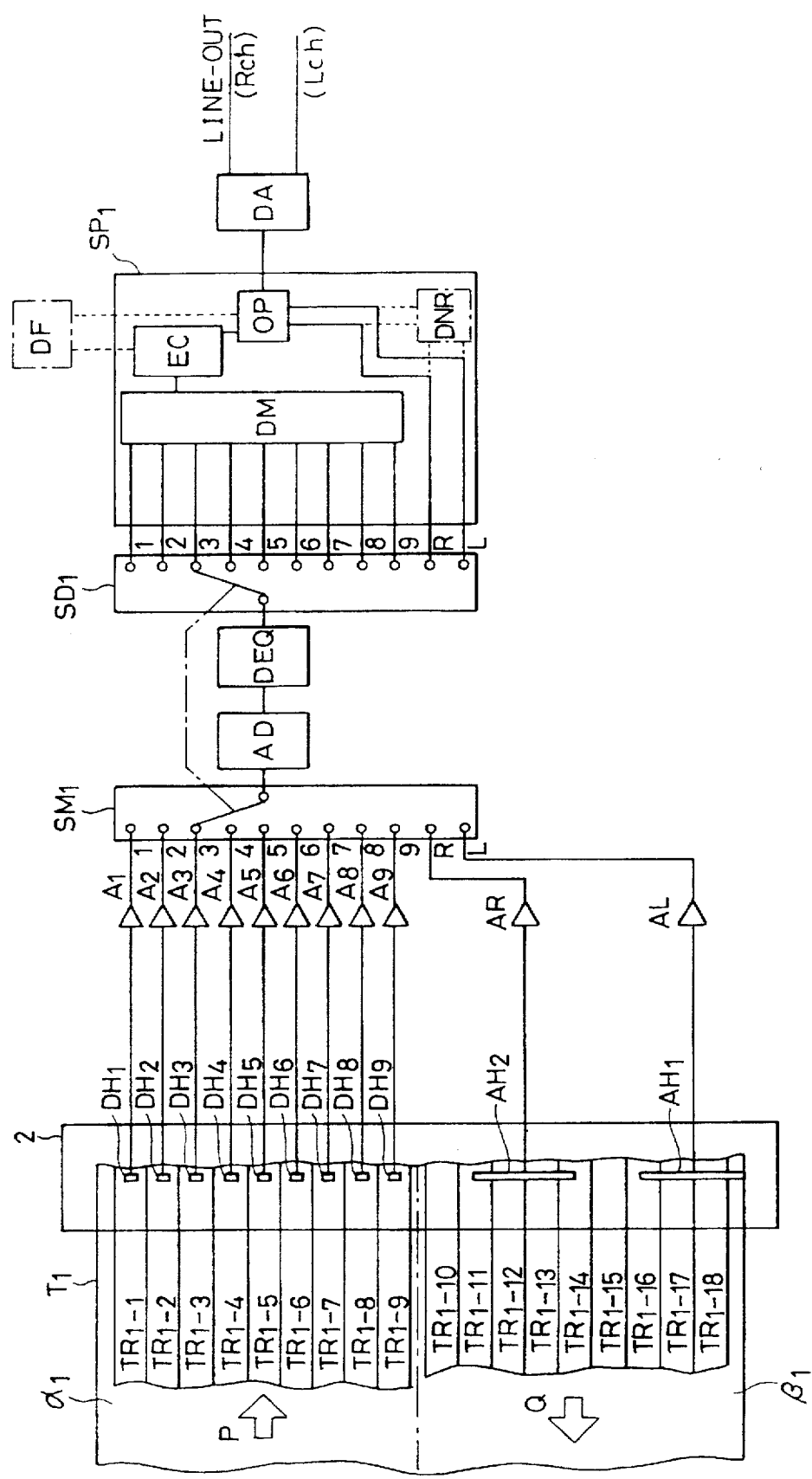
FIG. 1 is a schematic diagram for facilitating understanding of the reproducing operation from a magnetic tape on which recording is effected digitally, in a magnetic tape reproducing apparatus in accordance with a first embodiment of the present invention.

An operation for reproducing information from a first type of magnetic tape T1 on which information is recorded as digital signals on eighteen tracks TR1-1 to TR1-18, as the first recording format shown in FIG. 1, will be described.

Magnetic tape T1 is, similar to a second type of magnetic tape T2 which will be described later, accommodated in a cassette, not shown. Discrimination between magnetic tape type T1 and T2 is effected by a tape type identifying circuit, which will be described later. There are tracks TR1-1 to 1-9 and tracks TR1-10 to 1-18 parallel in the longitudinal direction, formed on recording areas α1 and β1 which areas are prepared by equally dividing magnetic tape T1 in the longitudinal direction.

When information on recording area α1 of magnetic tape T1 is to be reproduced, head elements DH1 to DH9 of head unit 2 read information on tracks TR1-1 to 1-9 from magnetic tape T1 running in the P direction. Read signals are amplified to a prescribed amplitude by means of amplifiers A1 to A9 and provided to switch SM1. At this time, in accordance with the result of tape type identification, which will be described later, switch SM1 switches connection between head amplifiers A1 to A9 and analog-digital converting circuit AD at a timing sufficiently quick with respect to the frequency of the reproduced signals from head elements DH1 to DH9. Therefore, output signals from head amplifiers A1 to A9 have their frequency characteristics inherent to the head per se corrected by analog-digital converting circuit AD and digital equalizing circuit DEQ, successively. The corrected signals are turned back to the signals for respective tracks by switch SD1 which is successively switched in synchronization with switch SM1, and these signals are input to succeeding demodulation-error correction circuit SP1.

Demodulation-error correction circuit SP1 carries out demodulation and error correction. When information has been compressed at the time of recording, expansion for recovering the compressed information is effected in an expansion circuit connected thereto, and the expanded information is returned to demodulation-error correction circuit SP1. Signals processed in an output circuit OP of demodulation-error correction circuit SP1 to have a data format suitable for digital-analog converting circuit DA of the succeeding stage are converted to stereo analog audio signals by digital-analog converting circuit DA and output as audio signals of left and right channels.

When digital signals as they are to be output, a digital signal output element may be used in place of digital-analog converting circuit DA, or a digital signal output element may be used together with digital-analog converting circuit DA.

When information on recording area β1 of magnetic tape T1 is to be reproduced, head base 3 is turned by overturning mechanism 4, so that the angle of head unit 2 is turned by 180°. Head elements DH1 to DH9 read information on tracks TR1-18 to TR1-10 of magnetic tape T1 running in the Q direction. Thereafter, the outputs from head elements DH1 to DH9 are processed in the same manner as described above, and output as audio signals of left and right channels through LINE OUT.

Figure 2:
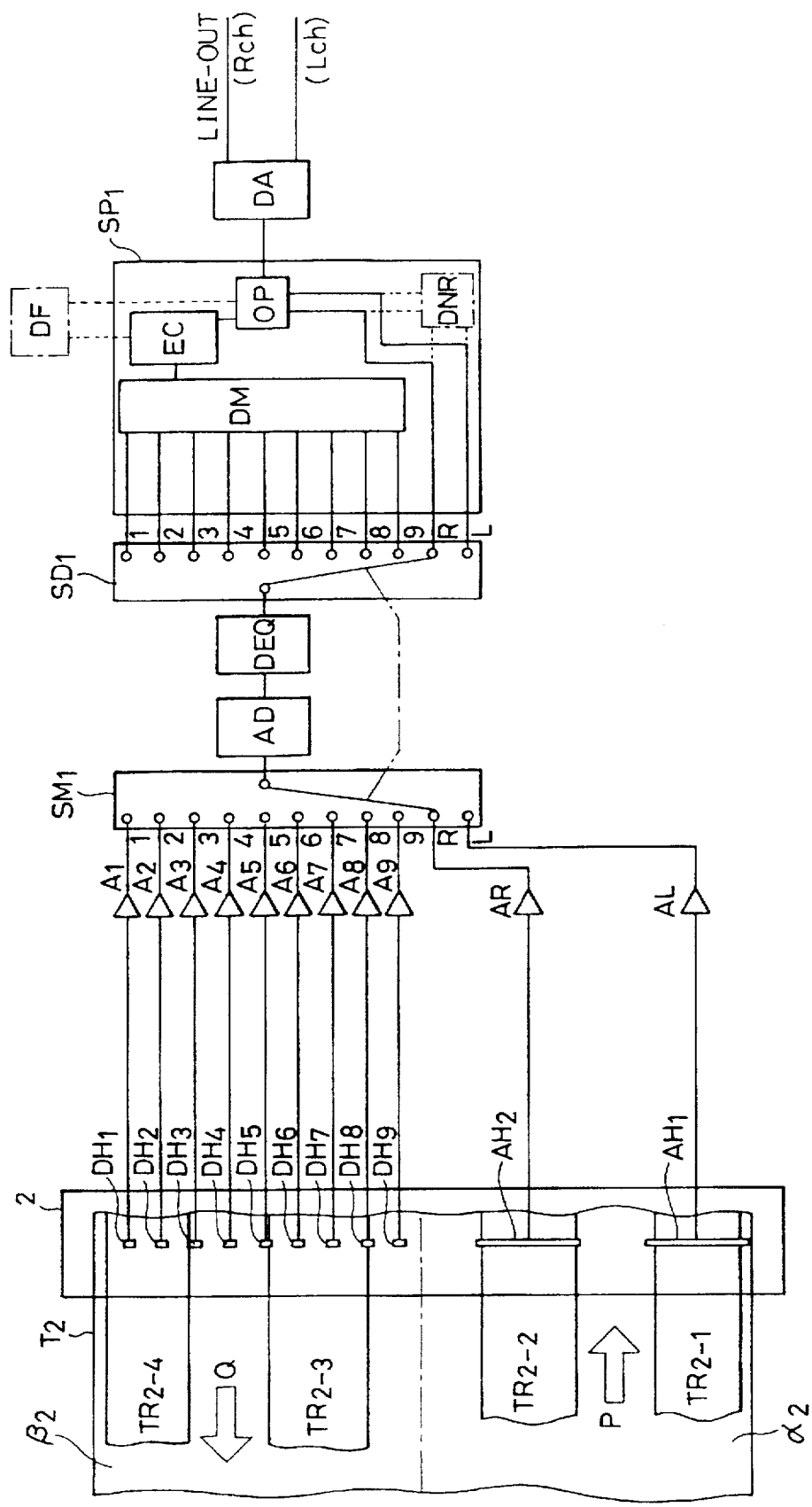
FIG. 2 is a schematic diagram for facilitating understanding of reproducing operation from a magnetic tape on which recording is effected in analog manner in the magnetic tape reproducing apparatus shown in FIG. 1.

Now, referring to FIG. 2, operation for reproducing information from magnetic tape T2, on which information is recorded as analog signals on four tracks TR2-1 to TR2-4 in the second recording format, will be described.

Tracks TR2-1 and 2-2 and tracks TR2-3 and 2-4 parallel in the longitudinal direction are formed on recording areas α2 and β2, respectively, which areas are prepared by equally dividing magnetic tape T2 in the longitudinal direction.

When information on recording area α2 of magnetic tape T2 is to be reproduced, head unit 2 is positioned in the similar manner as for reproducing information on recording area α1 of tape T1. In such a state, head elements AH1 and AH2 read information on tracks TR2-1 and TR2-2 from magnetic tape T2 running in the P direction.

At this time, switch SM1 switches connection between head amplifiers AR, AL and analog-digital converting circuit AD at a timing sufficiently quick with respect to the frequency of the reproduced signal, in accordance with the result of tape type identification. Accordingly, output signals from head amplifiers AR and AL have their frequency characteristics inherent to the head per se corrected by analog-digital converting circuit AD and digital equalizing circuit DEQ alternately, and these signals are subjected to optimal equalizing corresponding to the type of the tape. Output signals from equalizing circuit DEQ are turned back to the signals for respective tracks by switch SD1 which is alternately switched in synchronization with switch SM1, and provided to the succeeding demodulation-error correction circuit SP1.

In demodulation-error correction circuit SP1, processes such as demodulation-error correction-expansion are not necessary, and therefore these processes are not effected. When noise reduction is necessary, a digital-noise reduction circuit DNR having higher precision is used. Signals processed in the output circuit OP of demodulation-error correction circuit SP1 to have data format suitable for the digital-analog converting circuit DA of the succeeding stage are converted to stereo analog audio signals by digital-analog converting circuit DA, and output as audio signals of left and right channels from LINE OUT.

When information reproduced from magnetic tape T2 on which information is recorded by analog signals is to be output as digital signals, a digital signal output element may be used in place of digital-analog converting circuit DA, or a digital signal output element is used together with the digital-analog converting circuit DA.

When information on the recording area β2 of magnetic tape T2 is to be reproduced, the direction of head unit 2 is inverted by 180° by overturning mechanism 4, and head unit 2 is placed in the same manner as for reproducing information from recording area α2 of magnetic tape T2. In this state, head elements AH1 and AH2 read information on tracks TR2-4 and TR2-3 from magnetic tape T2 running in the Q direction. Thereafter, processing is carried out in the similar manner as described above, and outputs from head elements AH1 and AH2 are output as audio signals of left and right channels, respectively.

Figure 16:
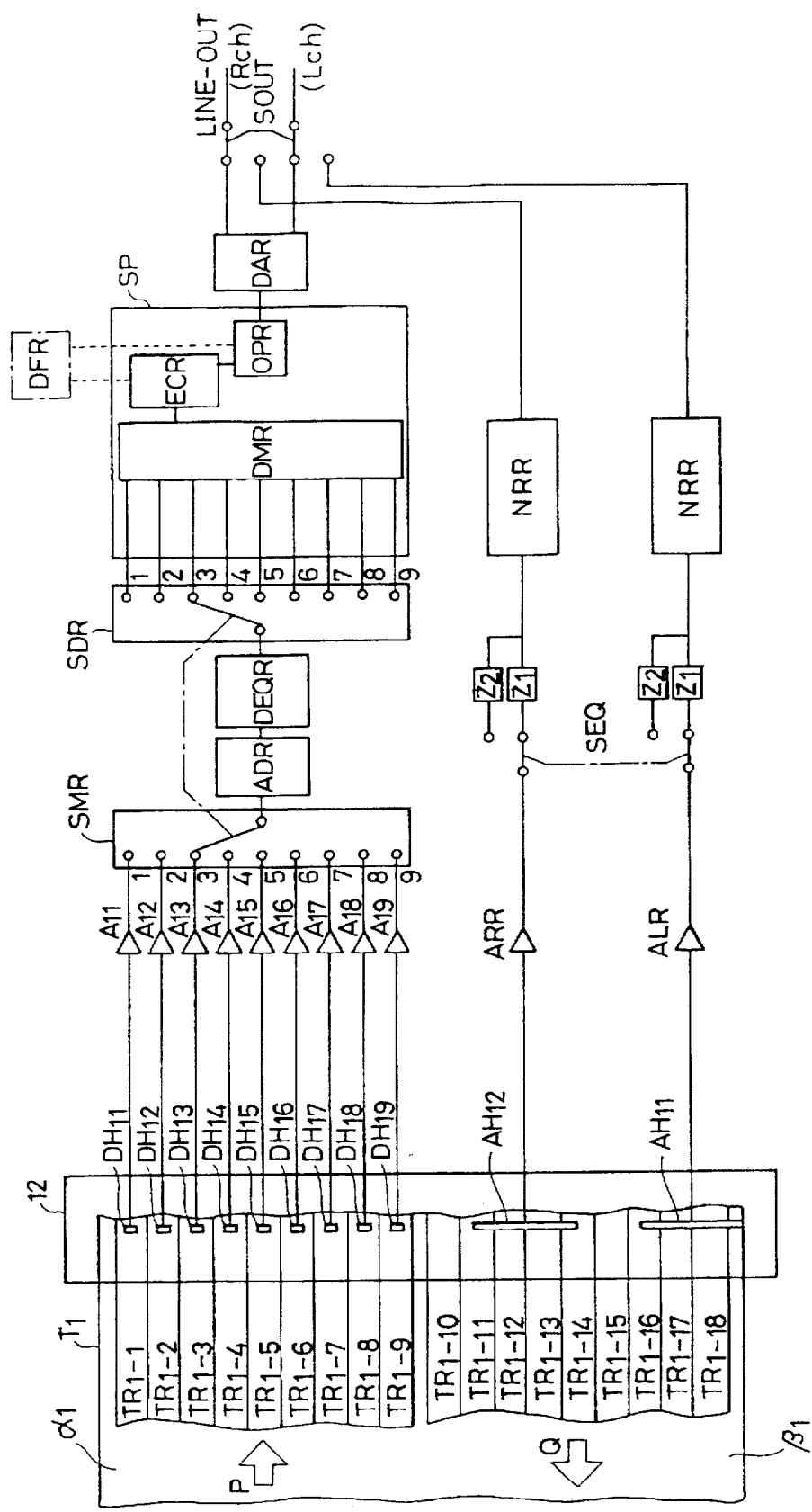
FIG. 16 is a schematic diagram for facilitating understanding of reproducing operation of a magnetic tape on which recording is effected digitally, in a conventional magnetic tape reproducing apparatus.
Figure 17:
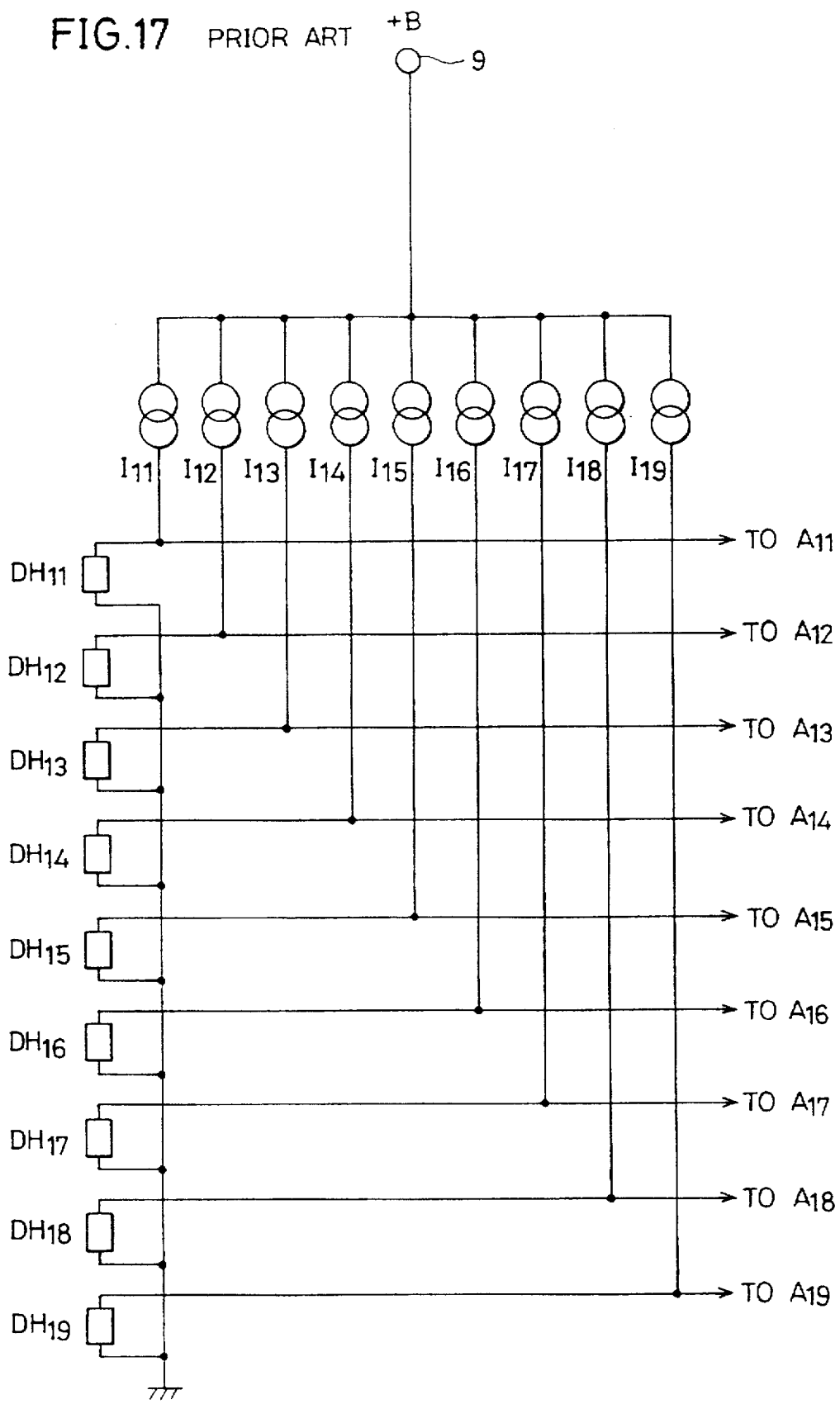
FIG. 17 shows a conventional sensing current supplying circuit.

Therefore, according to the present embodiment, information is reproduced from magnetic tapes T1 and T2 on which information is recorded in different recording formats by using the same type of analog-digital converting circuit AD, digital equalizing circuit DEQ, demodulation-error correction circuit SP1 and digital-analog converting circuit DA, so that equalizing circuit dedicated for reproduction of a tape of the second recording format (Z1 and Z2 of FIG. 16) and noise reduction circuit (NRR in FIG. 16) become unnecessary, so that the reproducing circuit can be simplified.

In addition, since processes such as equalizing and noise reduction in reproducing tape of the second recording format are carried out by digital signal processing, error and variation can be reduced.

Digital-noise reduction circuit DNR in demodulation-error correction circuit SP1 can be implemented without much increasing the circuit scale by integrating the demodulation circuit DM and the error correction circuit EC.

Further, only by adding a digital signal output element, the reproduction output signal from the tape of the second recording format can be provided as a digital signal without any specific circuit.

The operation of the tape type identifying circuit, switching operation of switches SM1 and SD1, and characteristic switching operation of digital equalizing circuit DEQ will be described.

Figure 4:
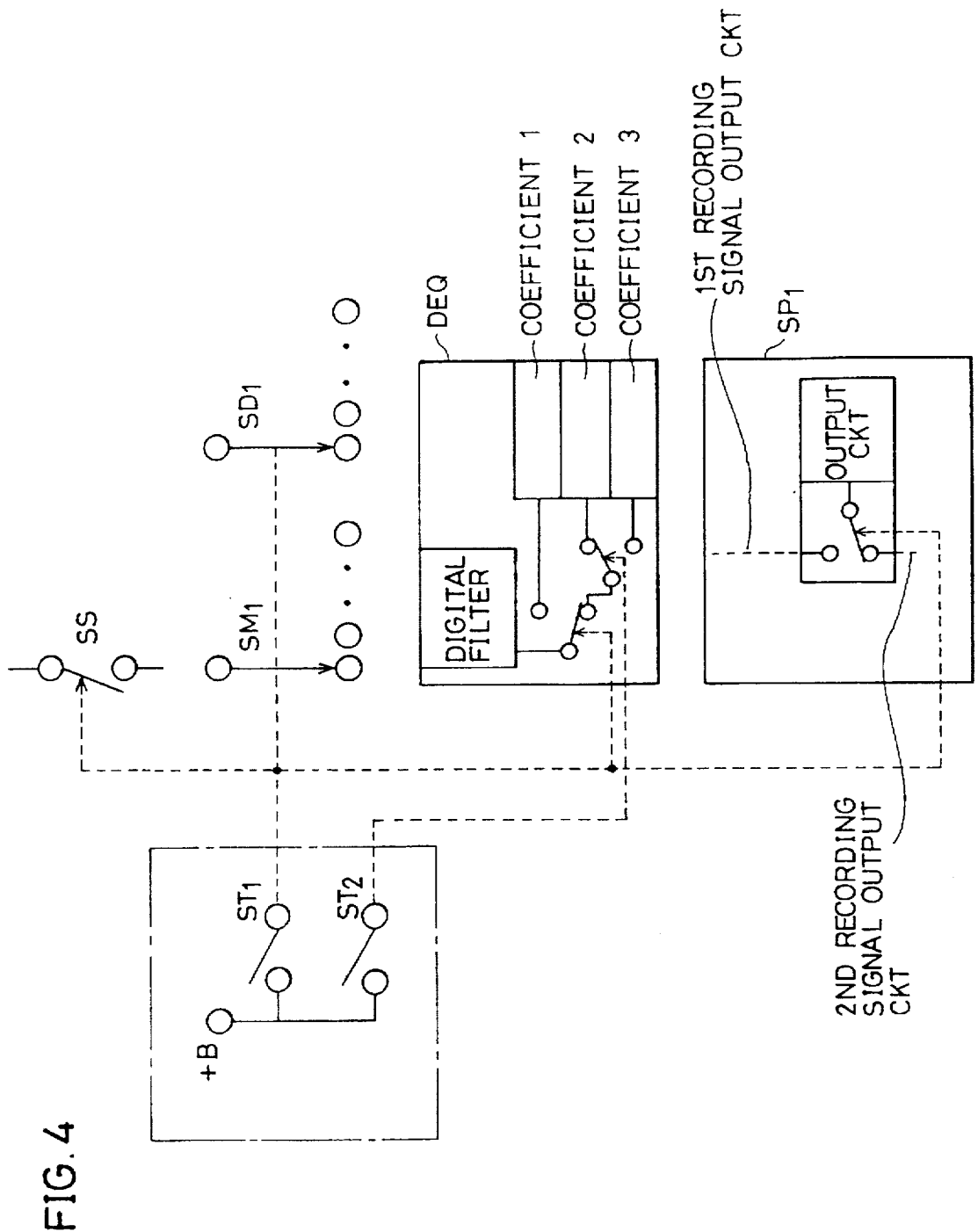
FIG. 4 is a block diagram showing a structure of a head type detecting circuit used in the magnetic tape reproducing apparatus shown in FIG. 1.

Referring to FIG. 4, the tape type identifying circuit includes a switch ST1 for detecting whether the tape is the first magnetic tape or the second magnetic tape, and a switch ST2 for detecting selection of reproduction characteristic of the second magnetic tape.

In order to detect whether the tape is the first magnetic tape or the second magnetic tape, switch ST1 detects, for example, a hole provided at a case accommodating the tape. When there is a hole on the case, it means that the tape is the first magnetic tape, and if there is not a hole, it means the second magnetic tape, for example.

Switch ST2 has been widely known for automatically switching equalizer during reproduction. More specifically, it is a switch for automatically switching reproduction characteristic for a normal tape, a metal-chromium tape or the like. Such tape type can be determined by detecting a notch provided at the case accommodating a second magnetic tape, as is well known.

In this embodiment, in accordance with the tape type detected by switches ST1 and ST2, switch SS for switching sensing current source is switched, switches SM1 and SD1 for time divisionally using analog-digital converting circuit AD and digital equalizing circuit DEQ are switched, characteristic of digital equalizing circuit DEQ is switched, and signal output from output circuit OP of demodulation-error correction circuit SP1 is switched. In addition, if the second magnetic tape is used, characteristic is switched by switch ST2 in digital equalizing circuit DEQ.

Referring to FIG. 5, order of switching switches SM1 and SD1 for using time divisionally analog digital converting circuit AD and digital equalizing circuit DEQ will be described. In accordance with a switch output indicating whether the tape is the first magnetic tape or the second magnetic tape, switches SM1 and SD1 are switched in a prescribed order for time divisionally using analog-digital converting circuit AD and digital equalizing circuit DEQ.

Referring to FIG. 5(a), when the tape is determined to be the first magnetic tape T1, switch SM1 successively switches contacts 1 to 9 in a prescribed order, so as to time divisionally switch signals which are input to the succeeding analog-digital converting circuit AD. As an example of the repetition period of this successive switching, 192 kHz is used, which is four times the maximum frequency, i.e. 48 kHz, of the signal recorded on the first magnetic tape.

Referring to FIG. 5(b), when the tape is determined to be the second magnetic tape T2, switch SM1 alternately switches contacts R and L only, and information from tracks TR2-1 and TR2-2 only are input to analog-digital converting circuit AD. Assuming that the switching is effected at the repetition period of 192 kHz as above, it means that sampling is effected at four times the frequency 48 kHz.

On the second magnetic tape T2, analog signals are recorded in the second recording format. For reproducing analog signals, it is known that the analog signals may have the frequency of 20 kHz at the highest. Generally, sampling frequency for converting the analog signals to digital signals should be twice the highest frequency, and generally 44.1 kHz or 48 kHz is used as the sampling frequency. In the present embodiment, the period of repetition is 192 kHz, which means that sampling is effected at a frequency four times the general sampling frequency of 48 kHz. Therefore, it is apparent that reproduction can be carried out with sufficient margin.

Contacts of switch SD1 are connected in synchronization with switch SM1. Therefore, when the second magnetic tape is reproduced, signals which have been subjected to waveform equalization and the like in digital equalizing circuit DEQ are provided to contacts R and L in synchronization with switch SM1, so that a signal input through contact R of SM1 is provided to contact R of SD1, and similarly, a signal input from contact L of SM1 is provided to the contact L of SD1.

Switching of characteristics such as waveform equalization of digital equalizing circuit DEQ will be described, by way of example.

Generally, an FIR (Finite Impulse Response, non-recursive) filter including a plurality of multipliers, delay circuits and the like combined, an IIR (Infinite Impulse Response, recursive) filter, and a filter combining both types of filters have been known as a digital equalizer. In such a digital filter, input digital information is successively delayed by a delay circuit, multiplied by a value calculated in advance to provide a prescribed characteristic to the output signal in each of the multipliers, and output from respective multipliers are synthesized and feedback (except in the FIR), whereby a digital filter having a desired property is realized. The value of each multiplier is generally called a tap value, and the number of taps is equal to the number of multiplications.

Especially, a filter having superior phase characteristic called a linear phase filter, which cannot be implemented by an analog filter, can be implemented by the FIR filter since it does not include any recursive element. In this embodiment, as compared with conventional equalizing circuits Z1 and Z2 constituted by analog elements, waveform equalization and the like can be carried out with higher precision and superior characteristic. In addition, as one digital equalizer is used switched time divisionally, error between tracks can be prevented.

Therefore, noise reduction, which will be described later (in the second embodiment, for example) in which erasure noise between tracks TR2-1 and TR2-2 and between TR2-3 and TR2-4 plus noise of the tape itself, or the noise of the tape itself between tracks TR2-2 and TR2-3 can be subtracted from signals reproduced from tracks TR2-1 to TR2-4 of the second magnetic tape on which information is recorded in the analog manner, which noise reduction has been impossible by a conventional analog filter.

Figure 6:
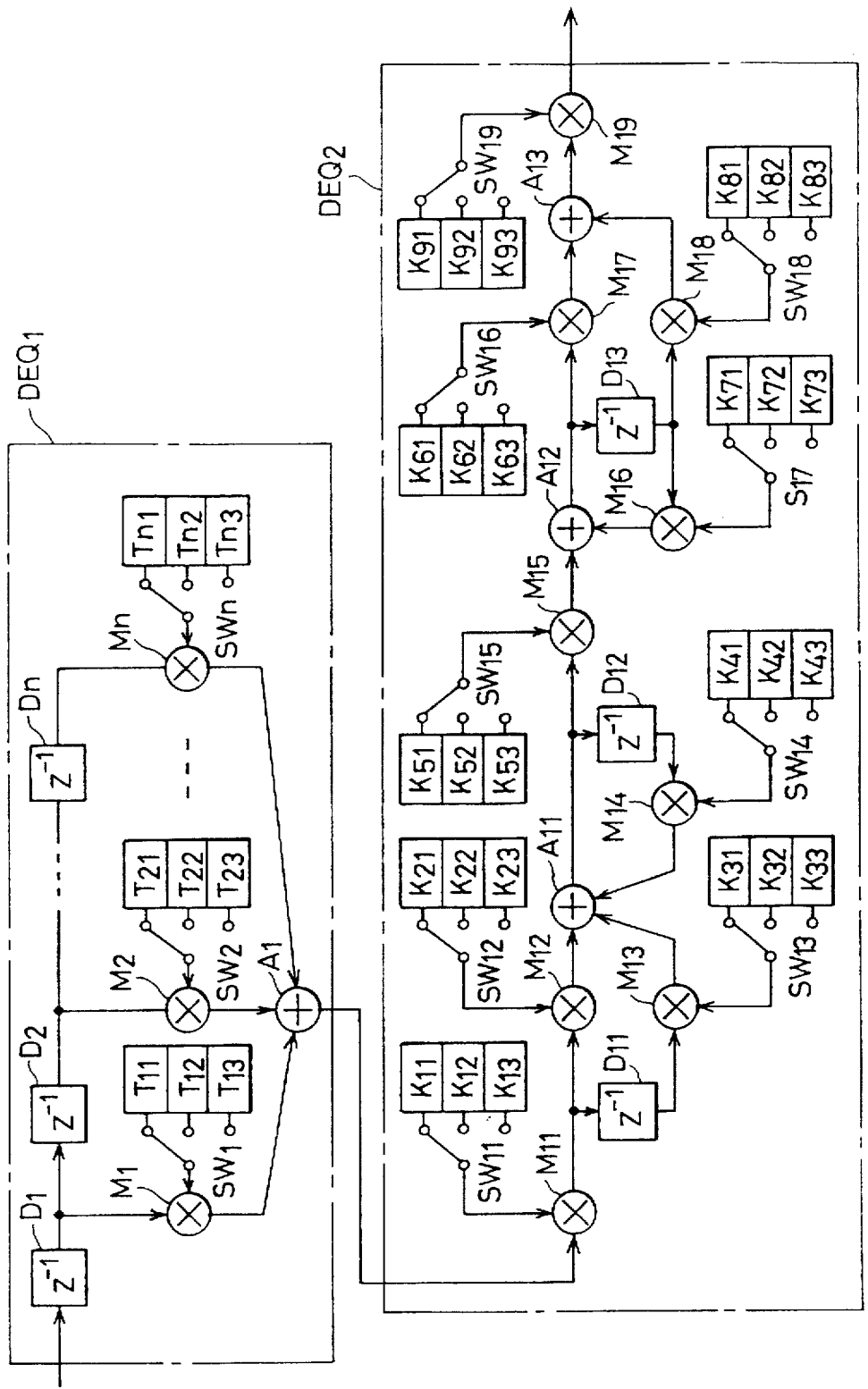
FIG. 6 is a block diagram showing a structure of a digital equalizing circuit shown in FIG. 1.

An example of a digital equalizing circuit will be described. Referring to FIG. 6, digital equalizing circuit includes an FIR portion DEQ1 and an IIR portion DEQ2. FIR portion DEQ1 includes delay circuits D1 to Dn, multipliers M1 to Mn, an adder A1, switches SW1 to SWn and registers T11 to T13, T21 to T23, . . . , Tn1 to Tn3. IIR portion DEQ2 includes delay circuits D11 to D13, multipliers M11 to M19, adders A11 to A13, and registers K11 to K13, . . . , K91 to K93.

In registers T11, T21, . . . , Tn1, prescribed coefficients corresponding to coefficient 1 shown in FIG. 4 are stored in advance; in registers T12, T22, . . . , Tn2, prescribed coefficient corresponding to coefficient 2 shown in FIG. 4 are stored in advance; and in registers T13, T23, . . . , Tn3, prescribed coefficients corresponding to coefficient 3 shown in FIG. 4 are stored in advance. Therefore, corresponding registers are selected in accordance with the tape type by switches SW1 to SWn, and selected coefficients are multiplied in multipliers M1 to Mn. Consequently, in FIR portion DEQ1, a prescribed equalizing process with respect to the frequency characteristic is effected, in accordance with the tape type.

In registers K11, K21, . . . , K91, prescribed coefficients corresponding to coefficient 1 shown in FIG. 4 are stored in advance; in registers K12, K22, . . . , K92, prescribed coefficients corresponding to coefficient 2 shown in FIG. 4 are stored in advance; and in registers K13, K23, . . . , K93, prescribed coefficients corresponding to coefficient 3 shown in FIG. 4 are stored in advance. Therefore, corresponding registers are selected in accordance with the tape type by switches SW11 to SW19, and selected coefficients are multiplied in multipliers M11 to M19. Consequently, a prescribed equalizing process with respect to the phase characteristic is effected in accordance with the tape type.

Therefore, by the above-described structure, digital equalizing circuit can carry out equalizing process in accordance with the tape type. Since frequency characteristic and phase characteristic can be set independent from each other, equalizing with high precision is enabled, and setting is facilitated.

<Embodiment 2>

A second embodiment of the present invention will be described with reference to FIGS. 7 and 8. Portions having similar function as the components described in Embodiment 1 are denoted by the same reference characters and description thereof is not repeated.

A magnetic head 12 in this embodiment includes a head unit 22 fixed on a head base 3, and turned by 180° by an overturning mechanism 4 as the head over turning means.

Figure 8:
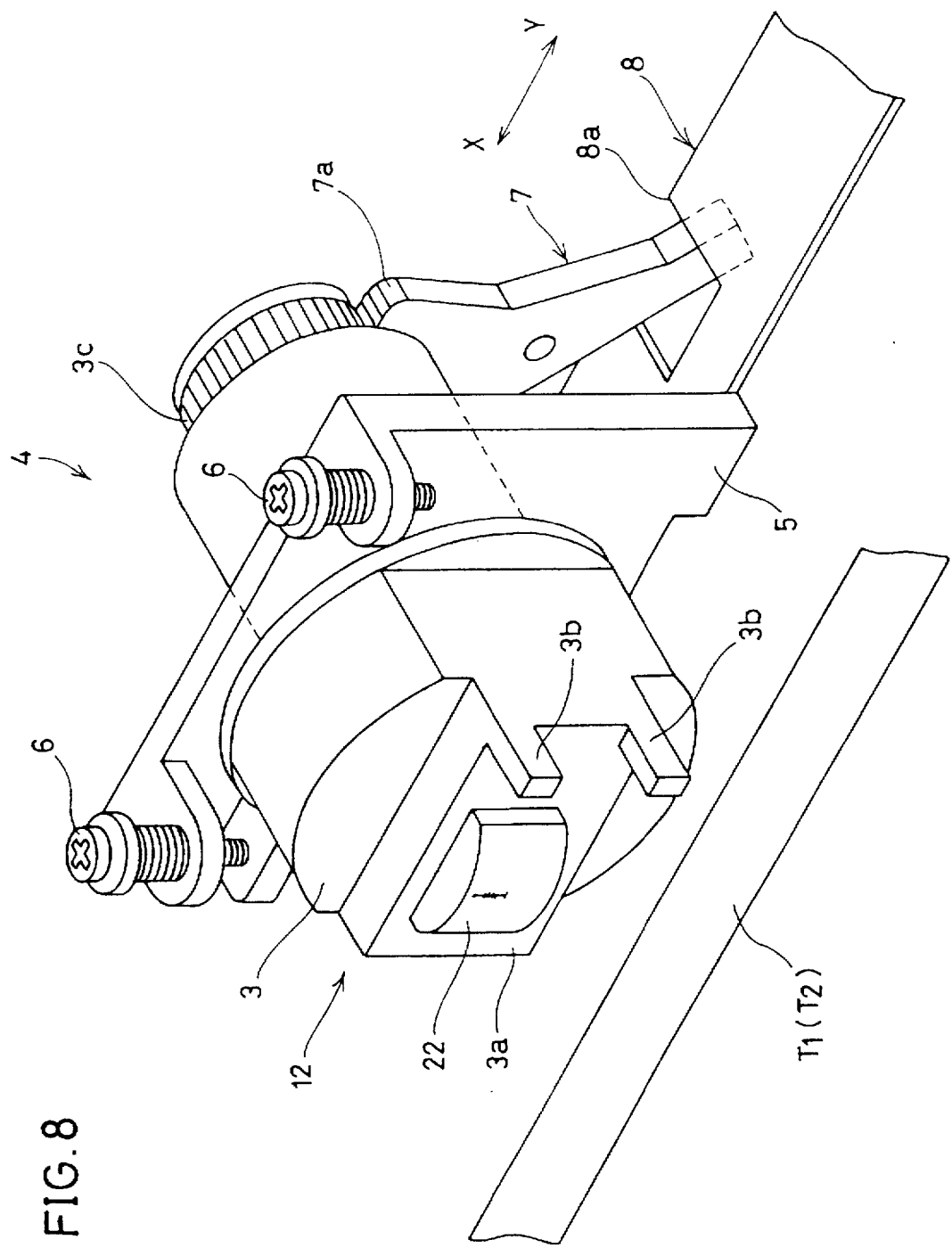
FIG. 8 is a perspective view showing a head overturning mechanism used in the magnetic tape reproducing apparatus shown in FIG. 7.

On head unit 22, head elements DH1 to DH9 which are thin film heads for the first recording format are provided with equal intervals on one side of the central portion of the tape contact surface, as shown in FIG. 8. For amplification to prescribed amplitude, head elements DH1 to DH9 are connected to head amplifiers A1 to A9. Outputs from respective head amplifiers are connected to an input side of a switch SM for using, switching time divisionally, a set of analog-digital converting circuit AD and a digital equalizing circuit DEQ for effecting highly precise digital equalizing. Signals processed and output from digital equalizing circuit DEQ are connected to a switch SD, and connected to a succeeding demodulation-error correction circuit SP2 track by track by switch SD, in synchronization with switch SM.

Output from demodulation-error correction circuit SP2 are connected to digital-analog converting circuit DA for recovering analog audio signals, and provided to LINE OUT.

In the above-described structure, the operation for reproducing information from a magnetic tape T1 of which information is recorded by digital signals on 18 tracks TR1-1 to TR1-18 in the first recording format is the same as the first embodiment described above, except that the demodulation-error correction circuit SP1 is replaced by SP2. Therefore, description thereof is not repeated.

Figure 7:
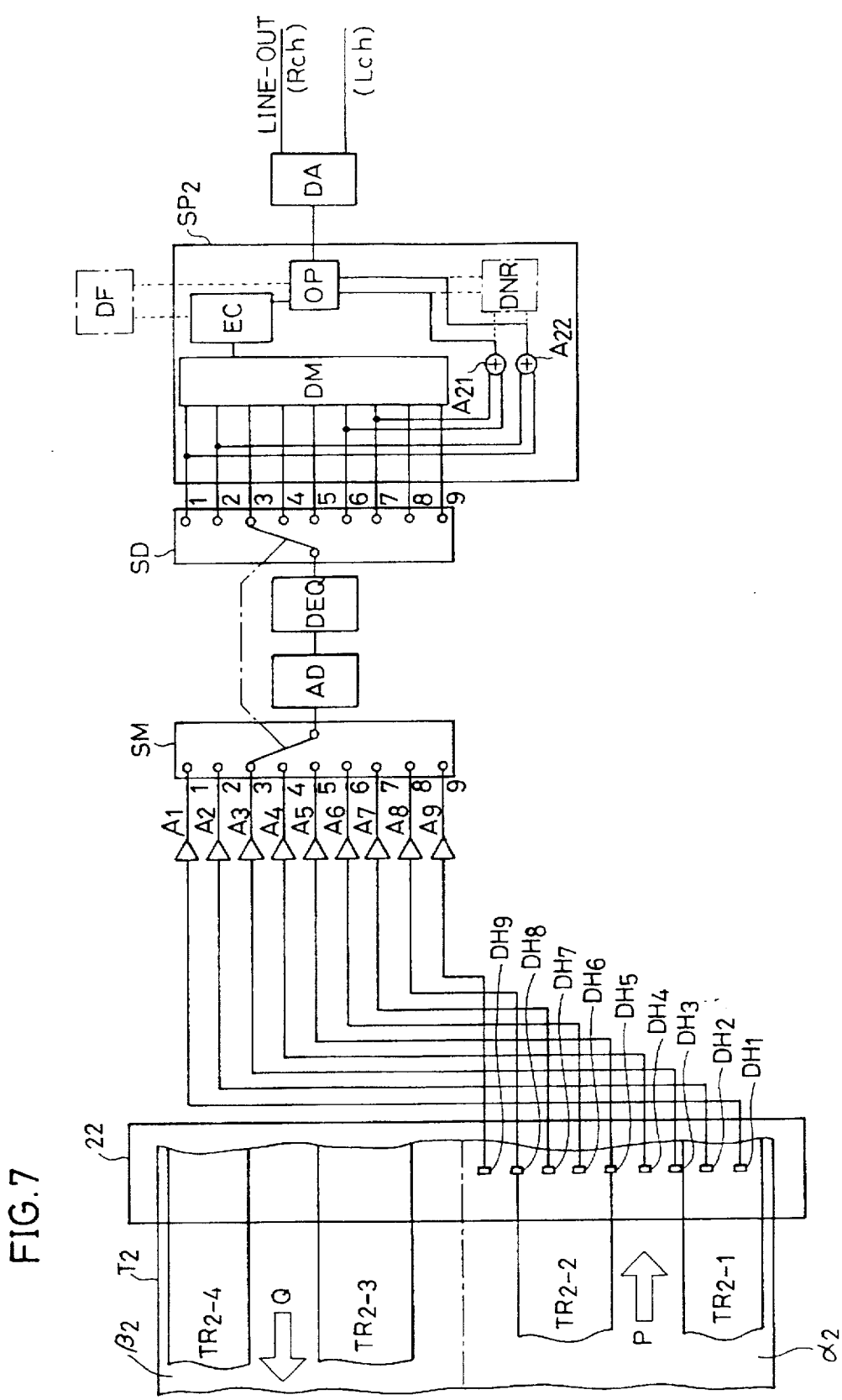
FIG. 7 is a schematic diagram for facilitating understanding of reproducing operation of a magnetic tape on which recording is effected in analog manner, in a magnetic tape reproducing apparatus in accordance with a second embodiment of the present invention.

An operation for reproducing information from magnetic tape T2 on which information is recorded by analog signals on four tracks TR2-1 to TR1-4 in the second recording format, as shown in FIG. 7, will be described.

Tracks TR2-1, TR2-2 and tracks TR2-3 and TR2-4 parallel in the longitudinal direction are formed on recording areas α2 and β2, respectively, which areas are prepared by dividing equally the magnetic tape T2 along the longitudinal direction.

When information on recording area α2 of magnetic tape T2 is to be reproduced, head unit 22 is placed in the similar manner as for reproduction from recording area β1 of magnetic tape T1. In this state, head elements DH1 and DH2, and DH6 and DH7 read information on tracks TR2-1 and TR2-2, respectively, of magnetic tape T2 running in the P direction.

At this time, by switch SM, contacts 1 to 9 are successively switched time divisionally at a timing sufficiently quick with respect to the reproduced signals, regardless of the tape type identification. Accordingly, output signals from head amplifiers A1 to A9 are subjected to correction of frequency characteristic of the head per se in analog-digital converting circuit AD and digital equalizing circuit DEQ successively, and in addition, the signals are subjected to optimal equalizing for the determined tape type. Thereafter, these signals are restored to signals of respective tracks by a switch SD which is successively switched in synchronization with switch SM, and provided to the succeeding demodulation-error correction circuit SP2.

In demodulation-error correction circuit SP2, from successively input signals of respective tracks which have been subjected to equalizing, signals from head elements DH1 and DH2 reading information on track TR2-1 of magnetic tape T2 and signals from head elements DH6 and DH7 reading information on track TR2-2 are added by adders A21 and A22. Here, processes such as demodulation-error correction-expansion are not necessary so that these processes are not carried out. When noise reduction is necessary, more precise digital noise reduction circuit DNR is used. Signals processed to have the data format suitable for the succeeding digital-analog converting circuit DA in an output circuit of demodulation-error correction circuit SP2 are provided to digital-analog converting circuit DA in which these signals are converted to stereo analog audio signals, and then output as audio signals of left and right channels from LINE OUT.

When information from magnetic tape T2 recorded by analog signals is to be output as digital signals, a digital signal output element may be employed in place of digital-analog converting circuit DA, or the digital signal output element may be used together with the digital-analog converting circuit DA.

When information on recording area β2 of magnetic tape T2 is to be reproduced, direction of head unit 22 is overturned by 180° by overturning mechanism 4, and head unit 22 is placed in the same manner as for reproduction of information on recording area α1 of magnetic tape T1. In this state, head elements DH1 and DH2 and DH6 and DH7 read information on tracks TR2-4 and TR2-3, respectively, of magnetic tape T2 running in the Q direction. Thereafter, similar processes as described above are carried out, and outputs from head elements DH1 and DH2 and outputs from head elements DH6 and DH7 are output as audio signals of left and right channels, respectively.

According to the present embodiment, from magnetic tapes T1 and T2 on which information are recorded in different recording formats, information can be reproduced by the same type of head elements DH1 to DH9 and the same type of processing circuits, that is, head amplifiers A1 to A9, switch SM, analog-digital converting circuit AD, digital equalizing circuit DEQ, switch SD, modulation-error correction processing circuit SP2 and digital-analog converting circuit DA, therefore the structure of head unit 22 can be simplified, and processing circuits dedicated for reproducing tape of the second recording format become unnecessary. Therefore, reproducing circuit itself can be simplified. Since equalizing and noise reduction in reproducing the tape recorded in the second recording format are effected by digital signal processing, error and variation can be reduced.

The selection/adding circuits A21, A22 for the signals from head elements DH1 and DH2 and signals from head elements DH6 and DH7 in, and digital noise reduction circuit DNR demodulation-error correction circuit SP2 can be implemented without much increasing the circuit scale by integrating demodulation circuit DM and error correction circuit EC combined. Further, only by adding a digital signal output element, the reproduced output from the tape recorded in the second recording format can be provided as digital signals without the need of providing a special circuit.

In the above described embodiment, in reproducing magnetic tape T2, contacts 1 to 9 of switch SM are switched time divisionally at a timing sufficiently quick for the reproduced signals. However, only the contacts 1, 2, 6 and 7 connected to head elements DH1, DH2, DH6 and DH7 opposing to the tracks may be switched time divisionally, sufficiently quick with respect to the reproduced signals. Alternatively, one head element may be selected for each track and contact 1 (or 2) and contact 6 (or 7) may be switched.

<Embodiment 3>

A third embodiment of the present invention will be described with reference to FIG. 9. This embodiment is the same as the above described Embodiment 2 except a demodulation-error correction circuit SP3, so that corresponding portions are denoted by the same reference characters, and description thereof is not repeated.

In the above described structure, operation for reproducing information from magnetic tape T1 on which information is recorded by digital signals on 18 tracks TR1-1 to TR1-18 in the first recording format is the same as the above described Embodiment 1 with the demodulation-error correction circuit SP1 replaced by SP3. Therefore, description is not repeated.

Figure 9:
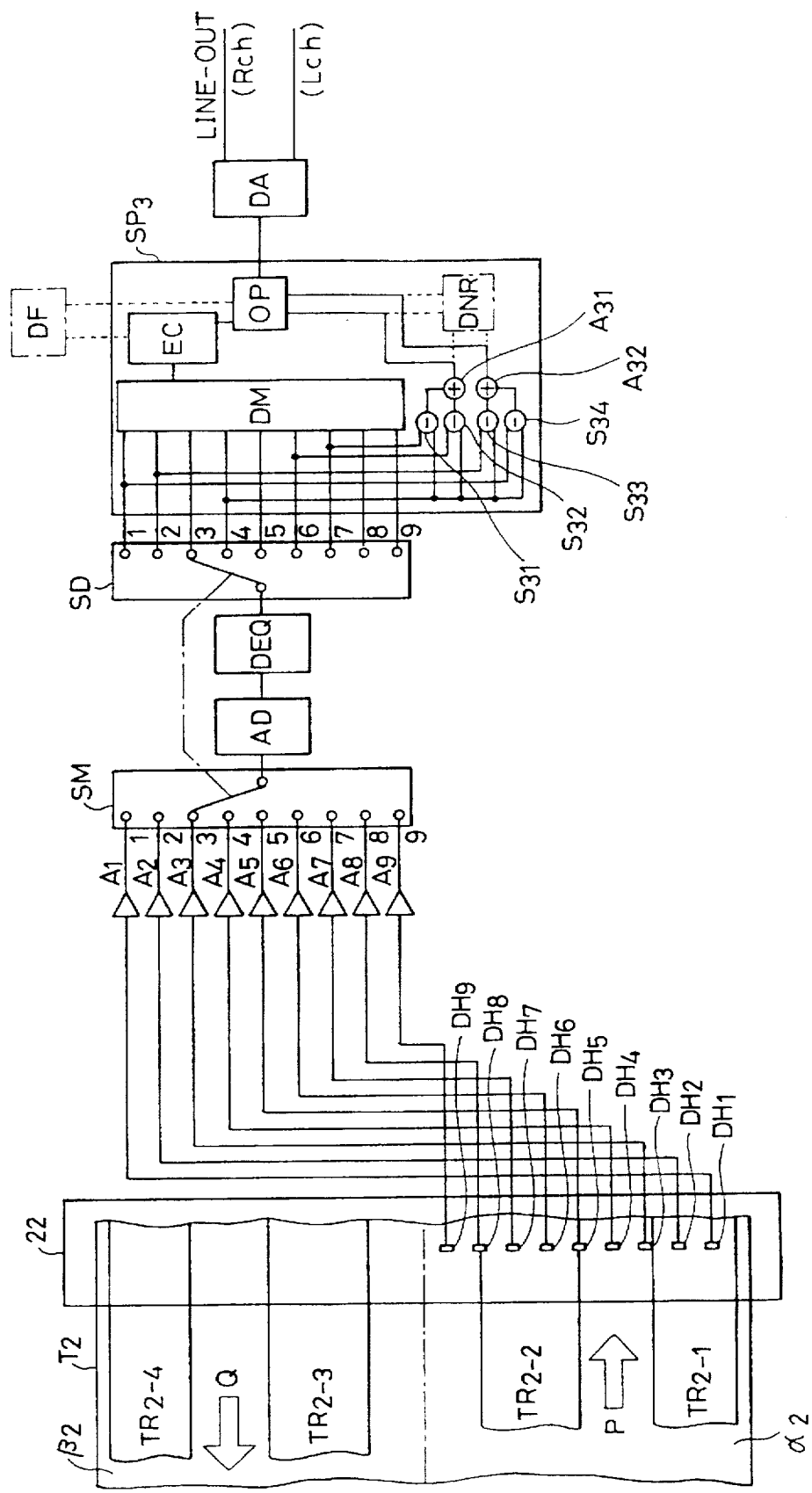
FIG. 9 is a schematic diagram for facilitating understanding of reproducing operation of a magnetic tape on which recording is effected in analog manner, in a magnetic tape reproducing apparatus in accordance with a third embodiment of the present invention.

Operation for reproducing information from magnetic tape T2 on which information is recorded by analog signals on four tracks TR2-1 to TR2-4 in the second recording format, as shown in FIG. 9, will be described.

Similar to the second embodiment described above, when information on recording area a2 of magnetic tape T2 is to be reproduced, head unit 22 is placed in the same manner as for reproduction of information on recording area β1 of magnetic tape T1. In this state, head elements DH1 and DH2, and DH6 and DH7 read information on tracks TR2-1 and TR2-2, respectively, of magnetic tape T2 running in the P direction. Therefore, output signals from head amplifiers A1 to A9 are subjected to correction of frequency characteristic inherent to the head per se by analog-digital converting circuit AD and digital equalizing circuit DEQ successively, and in addition, subjected to optimal equalizing for the determined tape type. Thereafter, signals for respective tracks are recovered by switch SD which is successively switch in synchronization with switch SM and input to the succeeding demodulation-error correction circuit SP3. In demodulation-error correction circuit SP3, successively input signals of respective tracks which have been equalized are used and a signal from head element DH4 which corresponds to the erased portion positioned between tracks, that is, noise component caused by erasure of magnetic tape, is subtracted from the signals from head elements DH1 and DH2 reading the information on track TR2-1 of magnetic tape T2 as well as from the signals from head elements DH6 and DH7 reading information on track TR2-2, by subtracters S31 to S34. Thereafter signals are added by adders A31 and A32, and fed to output circuit OP. As a result, noise component caused by erasure of magnetic tape can be removed from respective signals. If noise reduction is further required, a digital noise reduction processing circuit DNR of higher precision is used. The signals processed to have the data format suitable for the succeeding digital-analog converting circuit DA in the output circuit of demodulation-error correction circuit SP3 are provided to digital-analog converting circuit DA in which these signals are converted to stereo analog audio signals, and output as audio signals from left and right channels through LINE OUT.

When information on recording area β2 of magnetic tape T2 is to be reproduced, the direction of head unit 22 is turned by 180° by overturning mechanism 4, and head unit 22 is placed in the same manner as for reproduction from recording area a1 of magnetic tape T1. In this state, head elements DH1 and DH2, head elements DH6 and DH7, and head element DH4 read information on tracks TR2-4 and TR2-3 and noise component caused by erasure of magnetic tape, respectively, from magnetic tape T2 running in the Q direction. Thereafter, the same processes as described above are carried out. Output from head elements DH1 and DH2 as well as output from head elements DH6 and DH7 with noise component caused by erasure of magnetic tape removed, are provided as audio signals of left and right channels, respectively.

According to the present embodiment, from magnetic tapes T1 and T2 on which information is recorded in different recording formats, information can be reproduced by using the same type of head elements DH1 to DH9 and same type of processing circuits, that is, head amplifiers A1 to A9, switch SM, analog-digital converting circuit AD, digital equalizing circuit DEQ, switch SD, demodulation-error correction circuit SP3 and digital-analog converting circuit DA, so that structure of head unit 22 can be simplified, and processing circuit dedicated for reproduction of the tape in the second recording format becomes unnecessary. Thus reproducing circuit can be simplified. Since equalizing and noise reduction processing in reproducing the tape of the second recording format are effected by digital signal processing, error and variation can be reduced. In addition, since noise recorded on the tape itself can be removed, sound quality can be remarkably improved.

The subtractor-adder circuits S31 to S34, A31, A32 for subtracting/adding signals from head elements DH1 and DH2, signals from head elements DH6 and DH7 and erasure noise from head element DH4 in the demodulation-error correction circuit SP3 as well as the digital noise reduction circuit DNR can be implemented without much increasing the circuit scale by integrating the demodulation circuit DM and the error correction circuit EC.

Only by the addition of a digital signal output element, the reproduced output signal of the tape in the second recording format can be provided as a digital signal without the need for providing a special circuit.

In the above-described embodiment, sound quality is remarkably improved by subtracting a signal from head lement DH4 opposing to the erased portion of the magnetic tape positioned between tracks, that is, the erasure noise component on the magnetic tape from signals from head elements DH1, DH2, DH6 and DH7. However, a signal from head element DH9 corresponding to a not-yet recorded portion between tracks and corresponding to none of the tracks of magnetic tape 2, that is, noise component inherent to the magnetic tape per se, may be subtracted from signals from head elements DH1, DH2, DH6 and DH7. In that case, the noise component existing in magnetic tape itself can be removed from the reproduced signal, resulting in improved sound quality.

The noise reduction in this embodiment will be described in greater detail. The structure in which information is recorded by analog signals on four tracks TR2-1 to TR2-4 as the second recording format has been widely known, and therefore description thereof is not given here.

Figure 10:
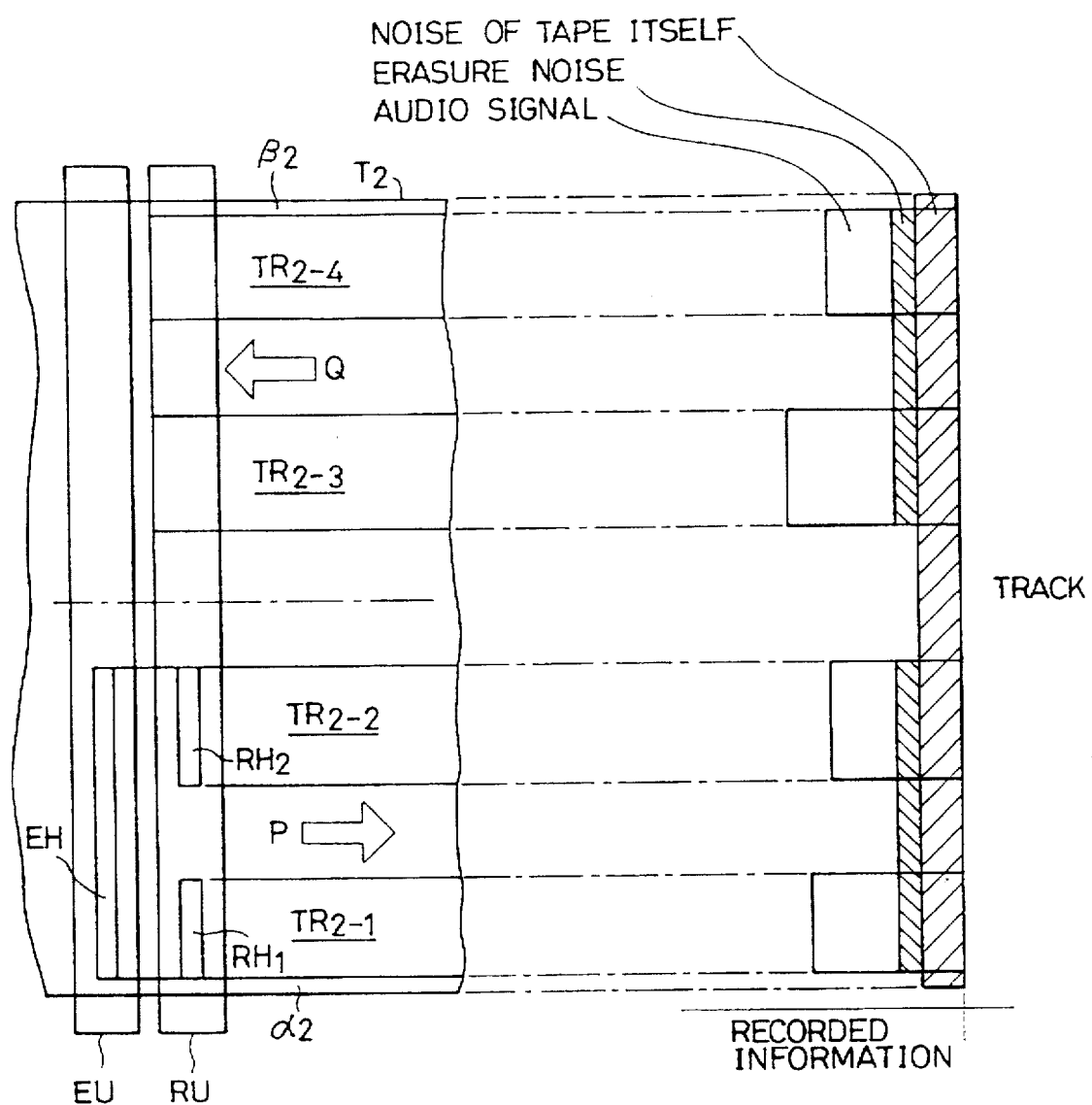
FIG. 10 is an illustration of noise reduction operation in the magnetic tape reproducing apparatus shown in FIG. 9.

FIG. 10 shows an example in which information is recorded by analog signals on four tracks TR2-1 to TR2-4 as the second recording format and recording is effected on recording area α2. By one erasure head EH incorporated in an erasure head unit EU, unnecessary information stored in the past is erased, both from tracks TR2-1 and TR2-2. Thereafter audio signals of left and right channels are recorded on tracks TR2-1 and TR2-2, respectively, of the magnetic tape moving in the P direction, by recording heads RH1 and RH2 incorporated in a recording head unit RU, respectively.

Therefore, as can be seen from the figure, there is a portion which is subjected only to the erasing operation by the erasure head EH between tracks TR2-1 and TR2-2, while there are portions which are not subjected to recording nor erasure between tracks TR2-2 and TR2-3 and on the outer side of track TR2-1. Information recorded on a certain position of the magnetic tape is shown in the form of a graph, on the right side of FIG. 10.

On tracks TR2-1 to TR2-4, there are audio signals+ erasure noise+noise of the tape itself;

between tracks TR2-1 and TR2-2 and between TR2-3 and TR2-4, there are erasure noise+noise of the tape itself; and between tracks TR2-2 and TR2-3, and on outer side of track TR2-1 and outer side of track TR2-4, there is the noise of the tape itself. Therefore, when reproduced signal between tracks TR2-1 and TR2-2 is subtracted from the reproduced signal from track TR2-1, there would be (audio signal+erasure noise+noise of the tape itself)–(erasure noise+noise of the tape itself)=audio signal.

When reproduced signal between tracks TR2-2 and TR2-3 is subtracted from the reproduced signal from track TR2-1, there would be (audio signal+erasure noise+noise of the tape itself)–(noise of the tape itself)=audio signal+ erasure noise.

In this embodiment, different from the conventional complicated noise reduction, noise can be reduced by subtracting (noise) from (signal+noise) which are reproduced in the similar manner. Preprocessing at the time of recording widely used in various noise reduction processes is not necessary. In this embodiment, head elements and circuits provided for reproduction of the first magnetic tape are made use of as the head elements and the circuits for noise reduction, and therefore addition of parts or circuits is not necessary.

<Embodiment 4>

Figure 11:
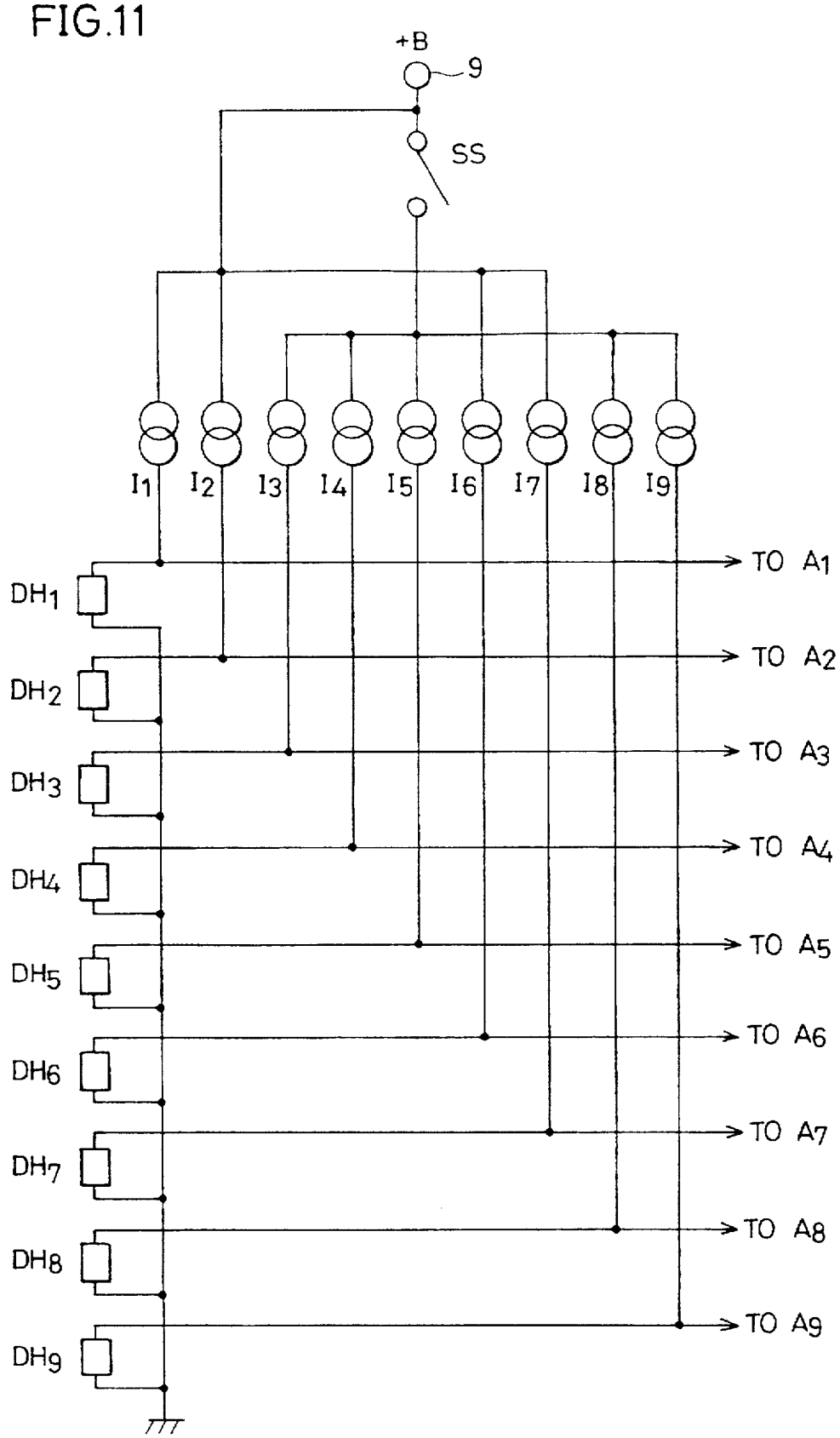
FIG. 11 is a schematic diagram of a sensing current supplying circuit showing a magnetic tape reproducing apparatus in accordance with a fourth embodiment of the present invention.
Figure 12:
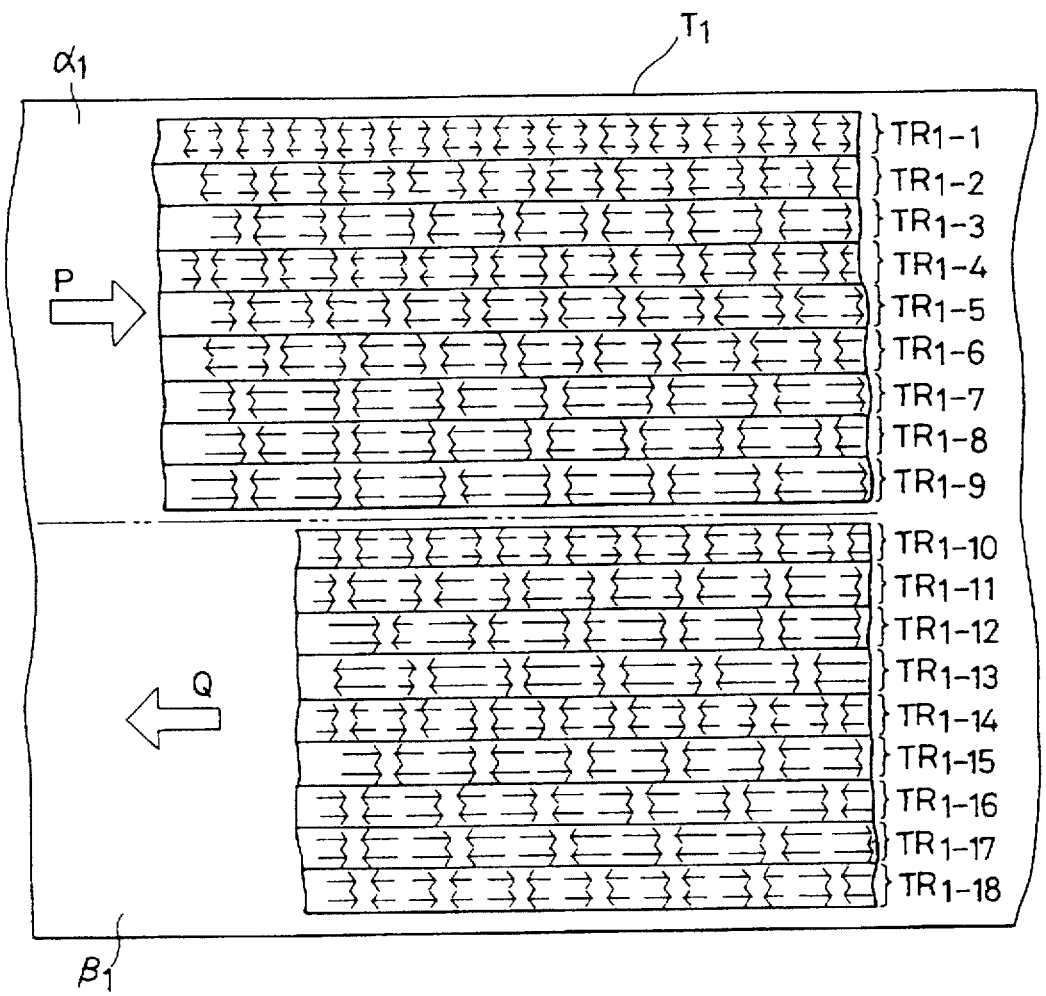
FIG. 12 shows arrangement of tracks on a magnetic tape on which recording is effected digitally.
Figure 13:
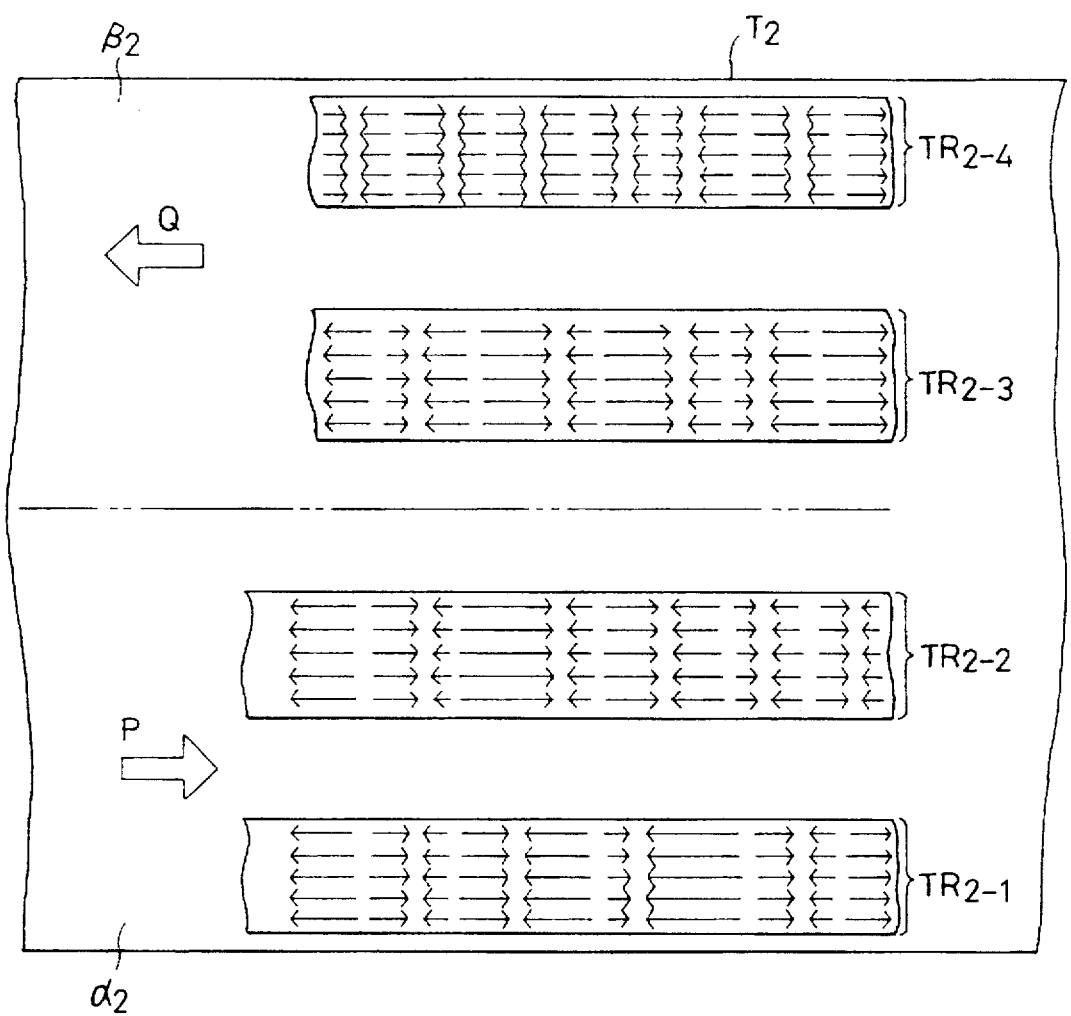
FIG. 13 shows arrangement of tracks on a magnetic tape on which recording is effected in analog manner.
Figure 14:
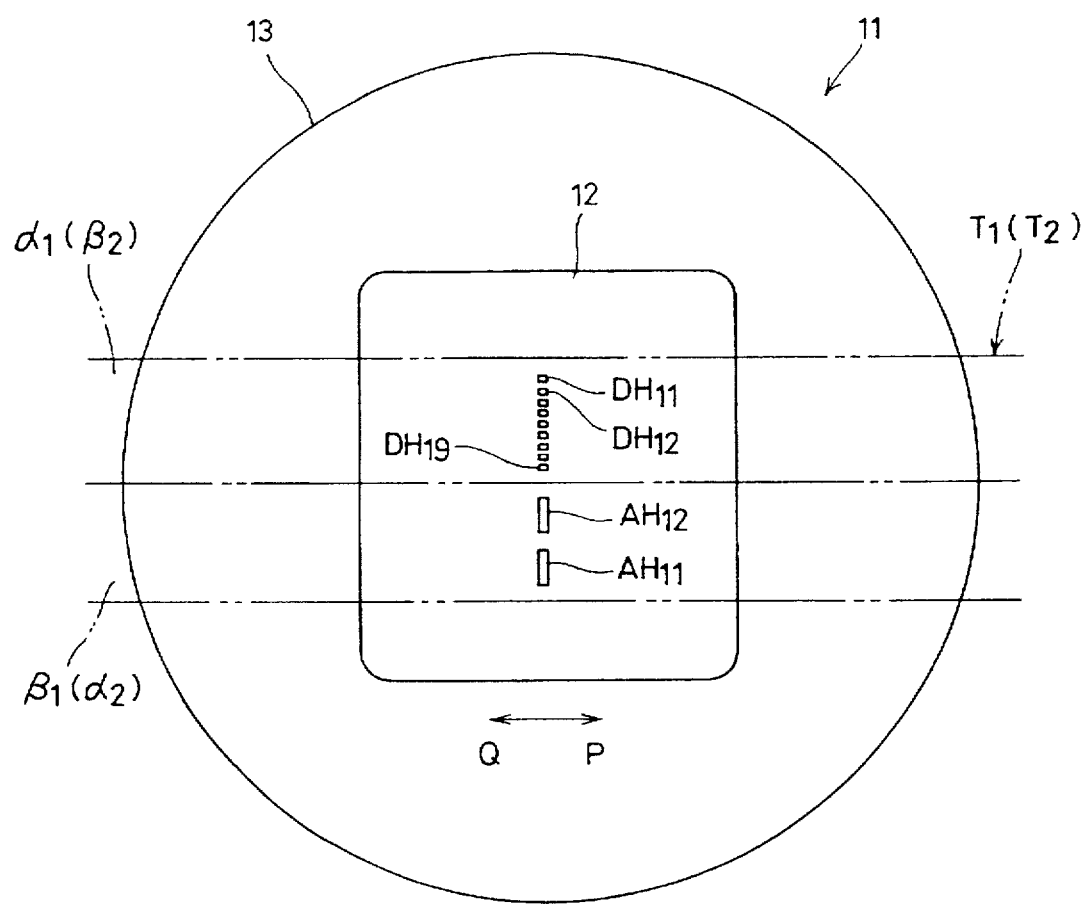
FIG. 14 is a plan view showing a structure of a reversible type magnetic head.
Figure 15:
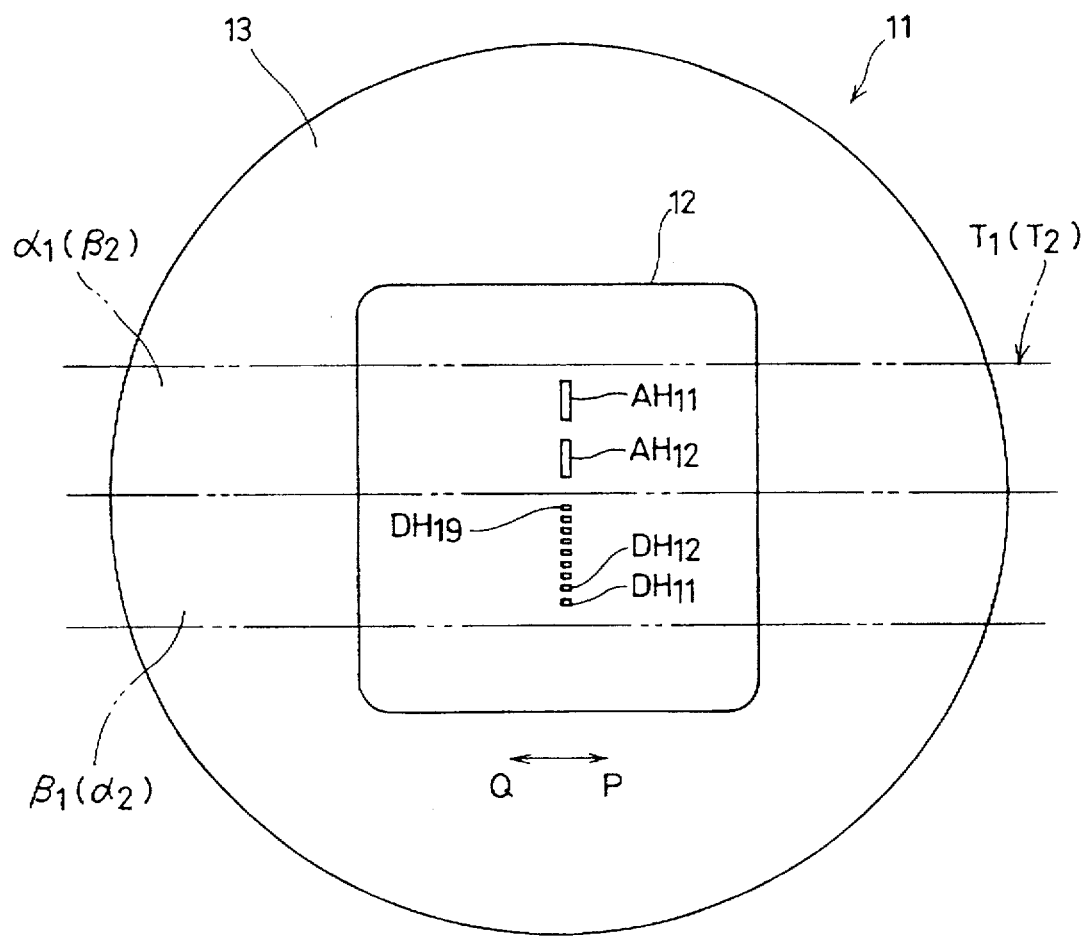
FIG. 15 is a plan view showing the magnetic head turned by 180° from the state of FIG. 14.

A fourth embodiment of the present invention will be described with reference to FIG. 11. An embodiment combined with the above described Embodiment 2 is shown. In this embodiment, a magneto resistive (MR head) is used as the magnetic head.

In the above described structure, an operation for reproducing information from magnetic tape T1 on which information is recorded by digital signals on 18 tracks TR1-1 to TR1-18 as the first recording format will be described. Tape type is identified by the above described tape type identifying circuit, and a switch SS is connected based on the result of identification. Consequently, sensing current is supplied to all MR head elements DH1 to DH9, and signals are read. The operation thereafter is the same as that of Embodiment 2, and therefore description thereof is not repeated.

An operation for reproducing information from magnetic tape T2 on which information is recorded by analog signals on four tracks TR2-1 to TR1-4 as the second recording format will be described. Similar to the above described operation, switch SS is cut in accordance with the result of identification by tape type identifying circuit. Therefore, sensing currents are supplied only to the MR head elements DH1, DH2, DH6 and DH7, and signals are read from these head elements. Signals cannot be read from MR heads DH3 to DH5, DH8 and DH9 to which sensing current is not supplied. However, as is apparent from the description of Embodiment 2, signals from these head elements are not used. Therefore there is no influence on the audio outputs of left and right channels.

According to the present embodiment, since switch SS is switched in accordance with the tape type, when information is to be reproduced from magnetic tape T2 on which information is recorded by analog signals on four tracks TR2-1 to TR2-4 in the second recording format, consumed sensing current can be reduced to 4/9, and therefore current consumption can be suppressed.

Further, in the demodulation-error correction circuit SP2 of Embodiment 2, from successively input signals of respective tracks which have been subjected to equalizing, signals from head elements DH1 and DH2 reading information on track TR2-1 of magnetic tape T2 are added to the signals from head elements DH6 and DH7 reading information on track TR2-2. However, when outputs as audio signals of left and right channels are to be obtained from a signal of one head element corresponding to each track without addition, only two sensing current sources are necessary, and therefore, the consumed sensing current can be further reduced to 2/9, and current consumption can be suppressed.

When this embodiment is combined with the above described Embodiment 3, the consumed sensing current can be reduced to 5/9 or 3/9, and therefore current consumption can be suppressed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A magnetic reproducing apparatus for sensing and reproducing information recorded in a first recording format and information recorded in a second recording format which is different from said first recording format, and for sensing and reproducing information from a first type of magnetic recording medium and from a second type of magnetic recording medium, said apparatus, comprising:

reproducing means for sensing and reproducing information recorded in said first and second format and for sensing and reproducing information recorded on said first and second time of magnetic recording medium;

first switch means for detecting the recording format being sensed and switching between first and second operative states in response to a first and second case for said first and second recording format for detecting whether a magnetic recording medium loaded in a body of the apparatus is said first recording format or said second recording format;

second switch means for detecting the type of recording medium being sensed, which is indicative of reproduction characteristics of the recording medium;

third switch means responsive to a switch state of said first switch means for controlling sensing current supplied to said reproducing means:

fourth and fifth mutually synchronized switch means for time divisionally selecting, in response to the switch state of said first switch means, reproduced signals from said reproducing means;

common digital signal processing means for providing output signals from both said formats of recording selected by said fourth and fifth switch means;

said digital signal processing means including analog to digital conversion means coupled to an output side of said fourth switch means, digital equalizing means coupled between said analog to digital conversion means and an input side of said fifth switch means, demodulation and error correction means coupled between an output side of said fifth switch means and digital to analog conversion means;

wherein said digital equalizing means includes a digital filter comprised of a finite impulse response section and an infinite impulse section, each of said sections having at least three selectable stored filter coefficients, and including sixth switch means responsive to a first switch state of said first switch means for selecting a first of said stored filter coefficients and to a second switch state of said first switch means for enabling a section of a second and a third of said stored filter coefficients, and seventh switch means responsive to a switch state of said second switch means for selecting the second or third of said stored filter coefficients; and wherein said demodulation and error correction means includes a first signal path having means for demodulating and error correcting digital signals reproduced from said first recording format and a second signal path for digital signals reproduced from said second recording format, an output circuit coupled to said digital to analog conversion means, and eighth switch means responsive to the switch state of said first switch means for coupling digital signals from said first signal path or said second signal path to said output circuit.

2. Magnetic recording apparatus according to claim 1 wherein said first recording format includes a magnetic tape having a first plurality of recording tracks formed along a longitudinal direction and said second recording format includes a magnetic tape having a second plurality of recording tracks formed along a longitudinal direction, and wherein the number of said first plurality of recording tracks is greater than the number of said second plurality of recording tracks.

3. Magnetic recording apparatus according to claim 2 wherein said first recording format comprises a digital format and said second recording format comprises an analog format.

4. Magnetic recording apparatus according to claim 2 wherein said reproducing means includes first and second type head elements.

5. Magnetic recording apparatus according to claim 4 wherein said first type of head elements comprise digital head elements and said second type head elements comprise analog type head elements.

6. Magnetic recording apparatus according to claim 2 wherein said reproducing means comprises a single type of head element.

7. Magnetic recording apparatus according to claim 6 wherein said single type of head element comprises a digital type of head element.

8. Magnetic recording apparatus according to claim 6 wherein said recording medium comprises a said second type of recording medium including a plurality of recording tracks on which information is recorded in said second recording format.

9. Magnetic recording apparatus according to claim 8 wherein said second recording format comprises an analog format and said single type of head element comprises a digital type of head element.

10. Magnetic recording apparatus according to claim 9 wherein at least one pair of mutually adjacent head elements of said digital type head elements sense and reproduce signals on one of said recording tracks.

11. Magnetic recording apparatus according to claim 10 wherein said second signal path includes signal adder means for summing signals sensed and reproduced by said pair of mutually adjacent head elements.

12. Magnetic recording apparatus according to claim 10 wherein said at least one pair of mutually adjacent head elements comprises plural pairs of said head elements for sensing and reproducing signals on a respective plurality of said recording tracks.

13. Magnetic recording apparatus according to claim 12 wherein said second signal path includes signal adder means for summing respective pairs of said signals sensed and reproduced by said pairs of head elements.

14. Magnetic recording apparatus according to claim 10 and additionally including at least one other digital type head element located so as to sense and reproduce signals on a portion of the recording medium apart from said at least one recording track and wherein said second signal path includes signal differencing means for subtracting signals sensed and reproduced by said one other head element from signals sensed and reproduced by said pair of mutually adjacent head elements on said recording track and generating a pair of difference signals, and signal summing means for adding said pair of difference signals and generating thereby a composite signal having noise cancellation.

15. Magnetic recording apparatus according to claim 14 wherein said at least one pair of mutually adjacent head elements comprise plural pairs of head elements for sensing and reproducing signals on a respective plurality of said recording tracks and additionally including at least one intermediate digital type head element located between two of said pairs of head elements for sensing and reproducing signals on a portion of the recording medium between a pair of said tracks and wherein said second signal path includes signal differencing means for subtracting signals sensed and reproduced by said intermediate head element from signals sensed and reproduced by said pairs of head elements on a pair of said tracks and generating respective pairs of difference signals and signal summing means for adding said respective pairs of difference signals and generating respective composite signals having noise cancellation.

16. Magnetic recording apparatus according to claim 6 wherein said head element comprises a magnetic head.

17. Magnetic recording apparatus according to claim 16, wherein said magnetic head comprises a magneto resistive head.

18. Magnetic recording apparatus according to claim 17 wherein said third switch means is responsive to the switch state of said first switch means to supply sensing current to all of said heads for information recorded in a digital recording format and only to a selected number of heads less than all of said heads for information recorded in an analog recording format.

19. Magnetic recording apparatus according to claim 1 wherein said first signal path includes expansion circuit means connected between said digital equalizing means and said eighth switch means for recovering information which has been compressed at the time of recording.

20. Magnetic recording apparatus according to claim 1 wherein said second signal path includes digital noise reduction circuit means connected between said fifth switch means and said eighth switch means.

* * * * *